United States Patent
Kitazato

(10) Patent No.: US 10,524,019 B2
(45) Date of Patent: *Dec. 31, 2019

(54) RECEIVER, RECEPTION METHOD, TRANSMITTER, TRANSMISSION METHOD, PROGRAM AND BROADCASTING SYSTEM

(71) Applicant: SATURN LICENSING LLC, New York, NY (US)

(72) Inventor: Naohisa Kitazato, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 299 days.

This patent is subject to a terminal disclaimer.

(21) Appl. No.: 14/657,203

(22) Filed: Mar. 13, 2015

(65) Prior Publication Data
US 2015/0189399 A1   Jul. 2, 2015

Related U.S. Application Data

(63) Continuation of application No. 13/212,972, filed on Aug. 18, 2011, now Pat. No. 8,988,612.

(30) Foreign Application Priority Data

Aug. 27, 2010 (JP) ................................ 2010-190865
Feb. 28, 2011 (JP) ................................ 2011-041801

(51) Int. Cl.
*H04N 21/65* (2011.01)
*H04N 21/81* (2011.01)
(Continued)

(52) U.S. Cl.
CPC ....... *H04N 21/8173* (2013.01); *H04N 21/236* (2013.01); *H04N 21/435* (2013.01);
(Continued)

(58) Field of Classification Search
CPC ...................................................... H04N 21/65
(Continued)

(56) References Cited

U.S. PATENT DOCUMENTS

| 5,652,749 A * | 7/1997 | Davenport | ......... H04N 21/2381 |
| | | | 348/464 |
| 7,103,904 B1 * | 9/2006 | Blackketter | ........ H04N 5/44543 |
| | | | 348/E5.105 |

(Continued)

FOREIGN PATENT DOCUMENTS

| EP | 1487214 | 12/2004 |
| JP | 2001-251266 A | 9/2001 |

(Continued)

OTHER PUBLICATIONS

Sep. 30, 2014, JP communication issued for related JP application No. 2011-041801.
(Continued)

*Primary Examiner* — Jefferey F Harold
*Assistant Examiner* — Justin B Sanders
(74) *Attorney, Agent, or Firm* — Paratus Law Group, PLLC

(57) ABSTRACT

Disclosed herein is a receiver for receiving transmitted AV content, the receiver including an extraction section adapted to extract trigger information, transmitted together with the AV content, about control over an application program to be executed in response to the AV content, and a control section adapted to control the acquisition, registration or activation of the application program, the firing of an event in the active application program, or the suspension or termination of the active application program according to one of the following commands indicated by the extracted trigger information, namely, Pre-cache, Register, Execute, Inject_event, Suspend or Terminate.

29 Claims, 31 Drawing Sheets

(51) Int. Cl.
*H04N 21/236* (2011.01)
*H04N 21/434* (2011.01)
*H04N 21/435* (2011.01)
*H04N 21/443* (2011.01)
*H04N 21/6543* (2011.01)

(52) U.S. Cl.
CPC ..... *H04N 21/4343* (2013.01); *H04N 21/4348* (2013.01); *H04N 21/443* (2013.01); *H04N 21/6543* (2013.01)

(58) Field of Classification Search
USPC ........................................................ 348/723
See application file for complete search history.

(56) References Cited

U.S. PATENT DOCUMENTS

| | | | | |
|---|---|---|---|---|
| 7,584,491 | B2* | 9/2009 | Bruckner | H04N 7/17318 709/213 |
| 2002/0144261 | A1 | 10/2002 | Schwalb et al. | |
| 2002/0168178 | A1 | 11/2002 | Rodriguez et al. | |
| 2003/0070169 | A1* | 4/2003 | Beyers, II | H04N 7/17318 725/51 |
| 2004/0031058 | A1 | 2/2004 | Reisman | |
| 2005/0076392 | A1* | 4/2005 | Jung | G11B 27/105 720/135 |
| 2005/0166257 | A1* | 7/2005 | Feinleib | H04N 7/163 725/136 |
| 2006/0271979 | A1 | 11/2006 | Hejna | |
| 2007/0245396 | A1* | 10/2007 | Kwon | H04N 5/4401 725/132 |
| 2008/0085695 | A1* | 4/2008 | Vare | G08B 25/08 455/404.1 |
| 2008/0111699 | A1* | 5/2008 | Kwon | G08B 27/008 340/601 |
| 2008/0247543 | A1 | 10/2008 | Mick et al. | |
| 2011/0078023 | A1* | 3/2011 | Aldrey | G06Q 30/02 705/14.55 |
| 2011/0222835 | A1* | 9/2011 | Dougherty | H04N 21/4307 386/248 |
| 2012/0023525 | A1* | 1/2012 | Rothschild | H04N 21/4312 725/44 |

FOREIGN PATENT DOCUMENTS

| | | |
|---|---|---|
| JP | 2003-209759 | 7/2003 |
| JP | 2004-096799 | 3/2004 |
| JP | 2004-507988 | 3/2004 |
| JP | 2005-510145 | 4/2005 |
| JP | 2006-50237 | 2/2006 |
| JP | 2006-135920 A | 5/2006 |
| JP | 2007-052691 | 3/2007 |
| JP | 2008-507177 | 3/2008 |
| JP | 2008-124529 A | 5/2008 |
| JP | 2010-166335 | 7/2010 |
| JP | 2010-268092 A | 11/2010 |
| KR | 10-2007-0098056 | 10/2007 |
| KR | 10-2009-0060915 | 6/2009 |
| WO | WO2005/076125 | 8/2005 |
| WO | WO2007/099906 | 9/2007 |
| WO | WO2009/057950 | 5/2009 |

OTHER PUBLICATIONS

Mar. 12, 2013, EPO Communication for related application No. EP 11 17 7845.

Jan. 15, 2013, EPO Communication for related application No. EP 11 17 7845.

Steven Morris et al., Interactive TV Standards: A Guide to MHP, OCAP, and JAVATV (Chapters 3 and 4), Jan. 1, 2005, Focal Press (Elsevier, Inc.), pp. 41-88.

Steven Morris et al., Interactive TV Standards: A Guide to MHP, OCAP, and JAVATV (Chapter 16, section "Stored Applications"), Jan. 1, 2005, Focal Press (Elsevier, Inc.), pp. 415-417.

ATSC Standard, ATSC Data Application Reference Model, Document A/94, Advanced Television Systems Committee (ATSC), Aug. 16, 2002.

Jul. 3, 2015, CN communication issued for related CN application No. 201110245384.

Jan. 14, 2014, European communication for related EP application No. 11177845.2.

Feb. 17, 2017, KR communication issued for related KR application No. 10-2011-0083069.

* cited by examiner

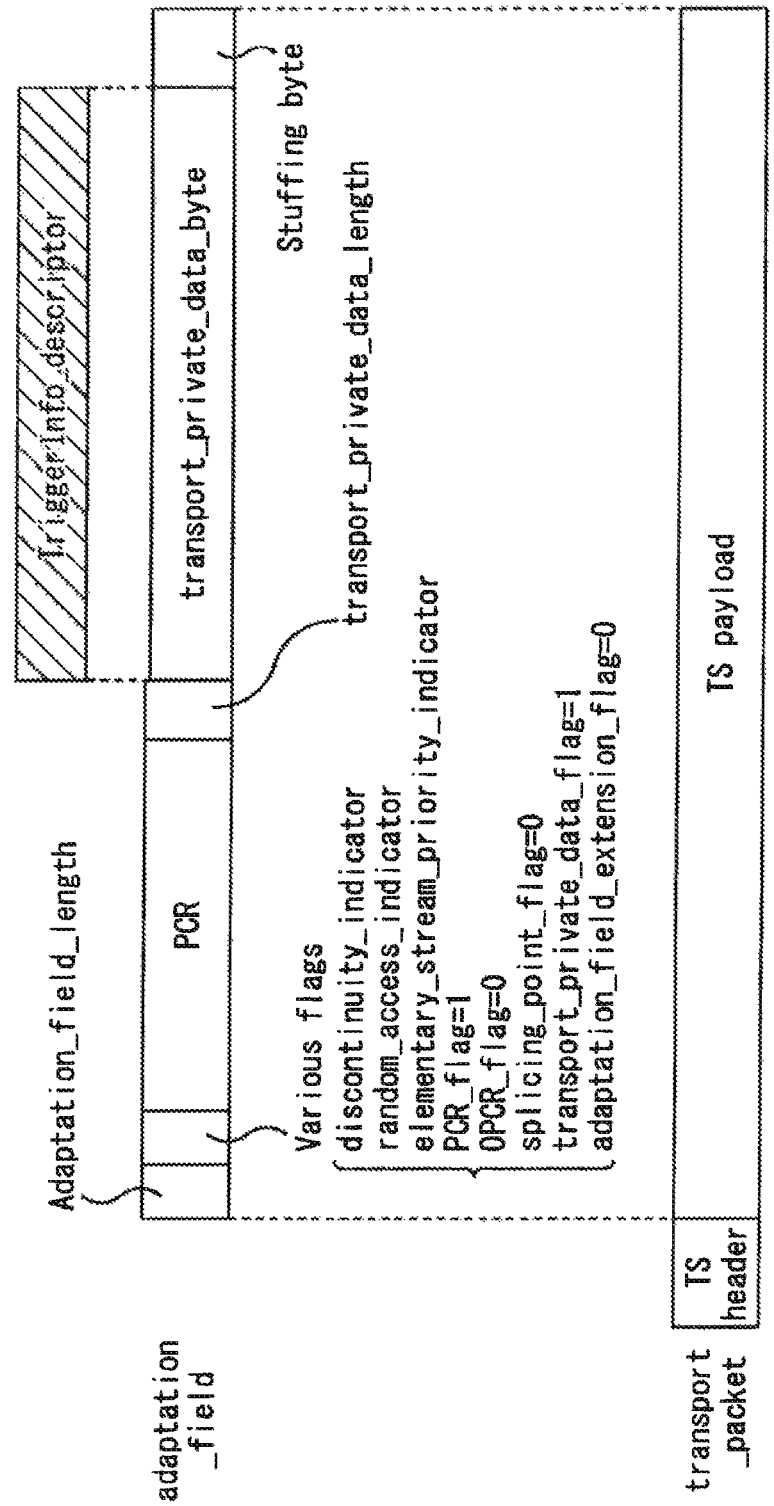

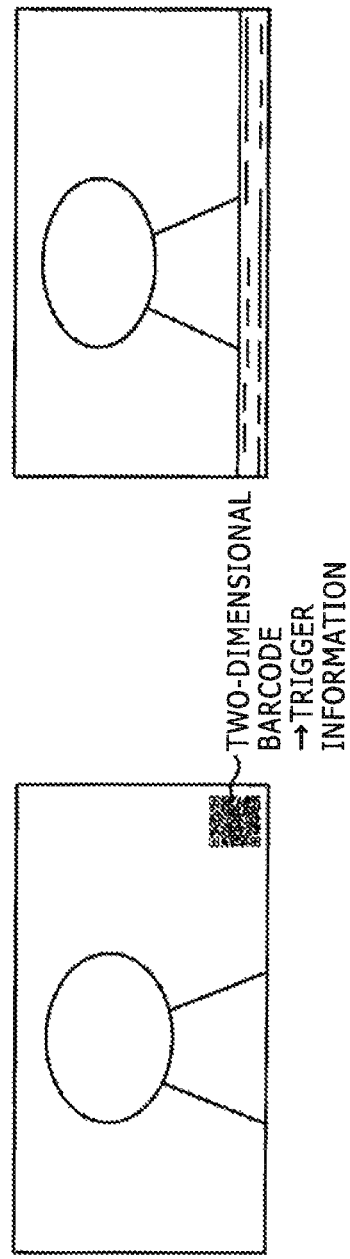

FIG. 8

Trigger with "Pre-cache" Command

| Item | No. of Bits | explanation |
|---|---|---|
| Trigger_id | 8 | Identify Trigger with same function. |
| Protocol_version | 8 | Set to 0 currently |
| Command_code | 8 | In this case, it indicates "Pre-cache" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| App_url | 32 | Location of application content if the application content exists on a server |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a server |

FIG. 9

Trigger with "Execute" Command

| Item | No. of Bits | explanation |
|---|---|---|
| Trigger_id | 8 | Identify Trigger with same function. |
| Protocol_version | 8 | Set to 0 currently |
| Command_code | 8 | In this case, it indicates "Execute" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| App_url | 32 | Location of application content if the application content exists on a server |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a server |
| App_life_scope | 1 | 0: ES bound    1: service bound |
| App_expire_date | 32 | Passing over it, Application shall be terminated if Terminated Command is not issued. |

FIG. 10

Trigger with "Inject_event" command

| Item | No. of Bits | explanation |
|---|---|---|
| Trigger_id | 8 | Identify Trigger with same function. |
| Protocol_version | 8 | Set to 0 currently |
| Command_code | 8 | In this case, it indicates "Inject_event" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| Event_id | 8 | The corresponding event which described in script of the targeted Application shall be fired immediately. |
| Event Embedded Data | N | It is free format data injected into Application along with event. |

FIG.11

Trigger with "Suspend" Command

| Item | No. of Bits | explanation |
|---|---|---|
| Trigger_id | 8 | Identify Trigger with same function. |
| Protocol_version | 8 | Set to 0 currently |
| Command_code | 8 | In this case, it indicates "Suspend" command. |
| Trigger_validity | 8 | The reciprocal of this integer value shows probability this trigger shall be treated as valid. |
| App_id | 24 | Application identifier this command target |
| App_type | 4 | Application type (for example HTML5) |

FIG. 12

Trigger with "Terminate" Command

| Item | No. of Bits | explanation |
|---|---|---|
| Trigger_id | 8 | Identify Trigger with same function. |
| Protocol_version | 8 | Set to 0 currently |
| Command_code | 8 | In this case, it indicates "Terminate" command. |
| Trigger_validity | 8 | The reciprocal of this integer value shows probability this trigger shall be treated as valid. |
| App_id | 13 | Application identifier this command target |
| App_type | 4 | Application type (for example HTML5) |

FIG.13

| Syntax | No. of Bits | Format |
|---|---|---|
| Trigger_Info_data() { | | |
|    trigger_id | 8 | uimsbf |
|    protocol_version | 8 | uimsbf |
|    command_code | 8 | uimsbf |
|    trigger_validity | 8 | uimsbf |
|    App_id | 24 | uimsbf |
|    App_type | 4 | uimsbf |
|    App_url | 32 | |
|    if(command_code==1) { | | (pre-cache) |
|       broadcast_App_flag | 1 | uimsbf |
|       downloaded_App_flag | 1 | uimsbf |
|       internet_App_flag | 1 | uimsbf |
|       reserved | 1 | "1" |
|    } | | |
|    if(command_code==2) { | | (execute) |
|       broadcast_App_flag | 1 | uimsbf |
|       downloaded_App_flag | 1 | uimsbf |
|       internet_App_flag | 1 | uimsbf |
|       App_life_scope | 1 | uimsbf |
|       App_expire_date | 32 | bslbf |
|    } | | |
|    if(command_code==3) { | | (inject event) |
|       reserved | 4 | "1111" |
|       event_id | 16 | uimsbf |
|       event_embedded_data_length | 8 | uimsbf |
|       for(i=0;i<N;i++) { | | |
|          event_embedded_data_byte | 8×N | bslbsf |
|       } | | |
|    } | | |
|    if(command_code==4 \|\| command_code==5) { | | (suspend/ terminate) |
|       reserved | 4 | "1111" |
|    } | | |
| } | | |

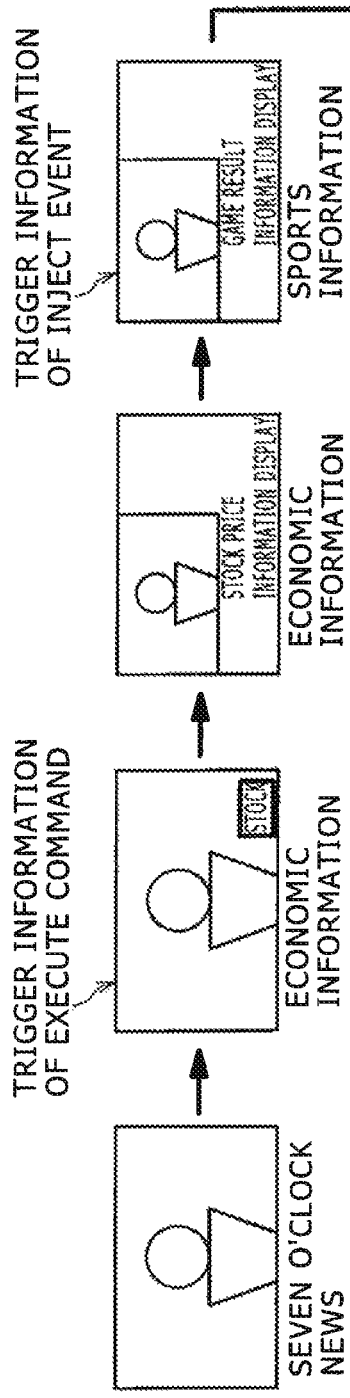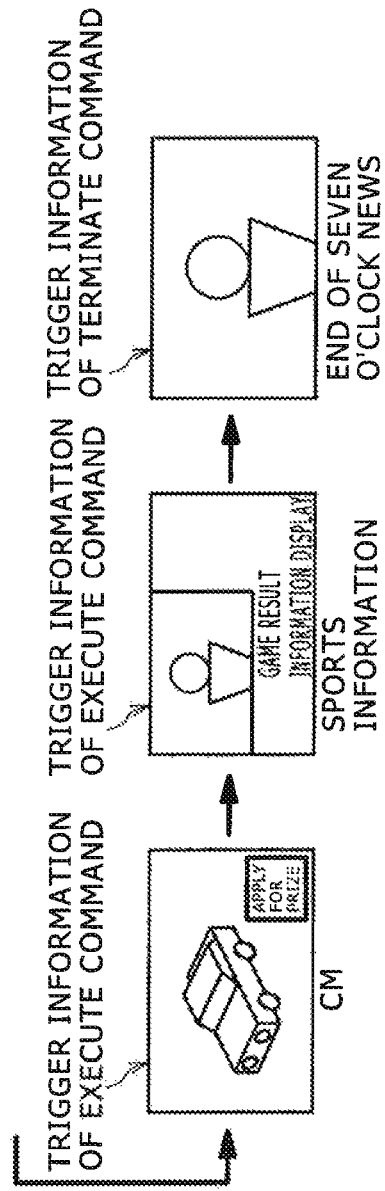

FIG. 19

Trigger with "Register" Command

| Item | No. of Bits | explanation |
|---|---|---|
| Trigger_id | 8 | Identification of trigger information of the same content |
| Protocol_version | 8 | Fixed to 0 (system version no.) |
| Command_code | 8 | Value indicating the Register command |
| Trigger_validity | 8 | Information indicating the probability of trigger Information becoming valid |
| App_id | N | Application ID (also indicates the URL of the destination of the application) |
| App_type | 4 | Type of the application |
| App_life_scope | 1 | Operational scope of the application |
| Persistent_priority | 2 | Priority level for acquisition and storage of the application |
| Expire_date | 32 | Expire date |

FIG. 20

Trigger with "Execute" Command

| Item | No. of Bits | explanation |
|---|---|---|
| Trigger_id | 8 | Identification of trigger Information of the same content |
| Protocol_version | 8 | fixed to 0 (system version no.) |
| Command_code | 8 | Value indicating the Execute command |
| Trigger_validity | 8 | Information indicating the probability of trigger information becoming valid |
| App_id | N | Application ID (also indicates the URL of the destination of the application) |
| App_type | 4 | Type of the application |
| App_life_scope | 1 | Operational scope of the application |
| Persistent_priority | 2 | Priority level for acquisition and storage of the application |
| Expire_date | 32 | Expire date |

FIG. 21

Trigger with "Inject_event" Command

| Item | No. of Bits | explanation |
|---|---|---|
| Trigger_id | 8 | Identification of trigger information of the same content |
| Protocol_version | 8 | Fixed to 0 (system version no.) |
| Command_code | 8 | Value indicating the Inject_event command |
| Trigger_validity | 8 | Information indicating the probability of trigger information becoming valid |
| App_id | N | Application ID (also indicates the URL of the destination of the application) |
| Event_id | 8 | ID of the event included in the target application |
| Event Embedded Data | M | Data transferred to the application when the event is fired |

FIG. 22

Trigger with "Suspend" Command

| Item | No. of Bits | explanation |
|---|---|---|
| Trigger_id | 8 | Identification of trigger information of the same content |
| Protocol_version | 8 | Fixed to 0 (system version no.) |
| Command_code | 8 | Value indicating the Suspend command |
| Trigger_validity | 8 | Information indicating the probability of trigger information becoming valid |
| App_id | N | Application ID (also indicates the URL of the destination of the application) |

FIG. 23

Trigger with "Terminate" Command

| Item | No. of Bits | explanation |
|---|---|---|
| Trigger_id | 8 | Identification of trigger information of the same content |
| Protocol_version | 8 | Fixed to 0 (system version no.) |
| Command_code | 8 | Value indicating the Terminate command |
| Trigger_validity | 8 | Information indicating the probability of trigger information becoming valid |
| App_id | N | Application ID (also indicates the URL of the destination of the application) |

FIG. 24

| Syntax | No. of Bits | Format |
|---|---|---|
| Trigger_Info_data() { | | |
|   trigger_id | 8 | uimsbf |
|   protocol_version | 8 | uimsbf |
|   command_code | 8 | uimsbf |
|   trigger_validity | 8 | uimsbf |
|   app_id_length | 8 | uimsbf |
|   for(i=0;i<N;i++) { | | |
|     app_id_byte | 8 | bslbsf |
|   } | | |
|   if(command_code==1 \|\| command_code==2) { | | (register/execute) |
|     app_type | 4 | uimsbf |
|     app_life_scope | 1 | uimsbf |
|     persistent_priority | 2 | Uimsbf |
|     reserved | 1 | |
|     app_expire_date | 32 | uimsbf |
|   } | | |
|   if(command_code==3) { | | (Inject event) |
|     event_id | 16 | uimsbf |
|     event_embedded_data_length | 8 | uimsbf |
|     for(i=0;i<N;i++) { | | |
|       event_embedded_data_byte | 8×N | bslbf |
|     } | | |
|   } | | |
|   if(command_code==4 \|\| command_code==5) { | | (suspend/terminate) |
|     reserved | 4 | "1111" |
|   } | | |
| } | | |

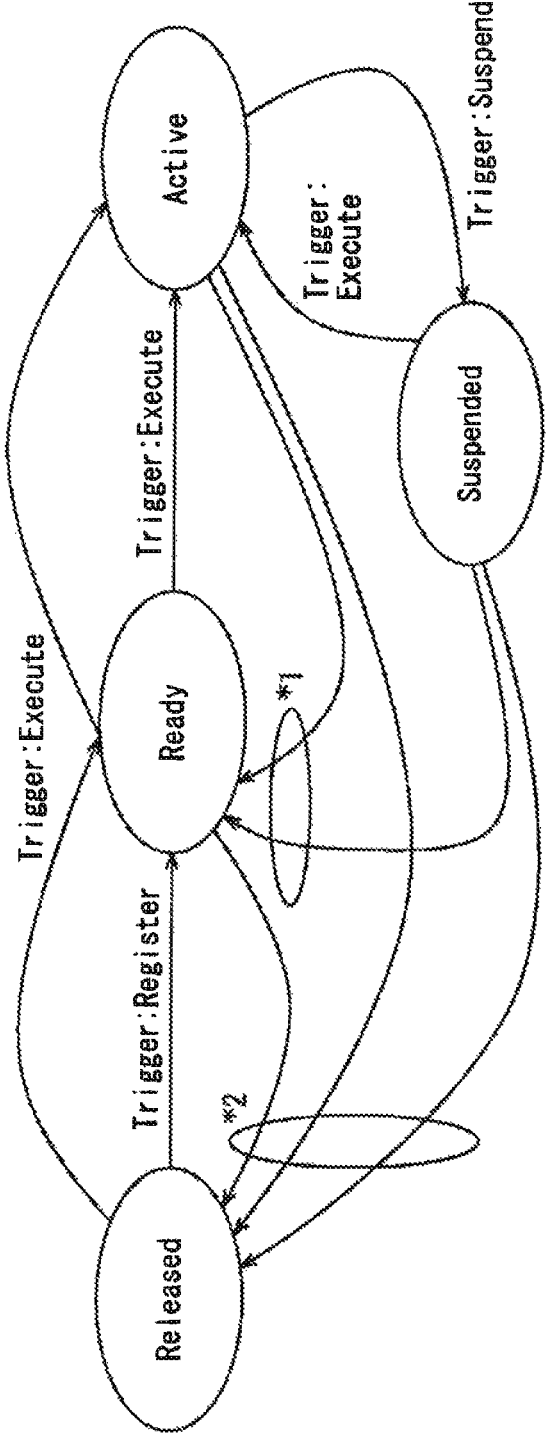

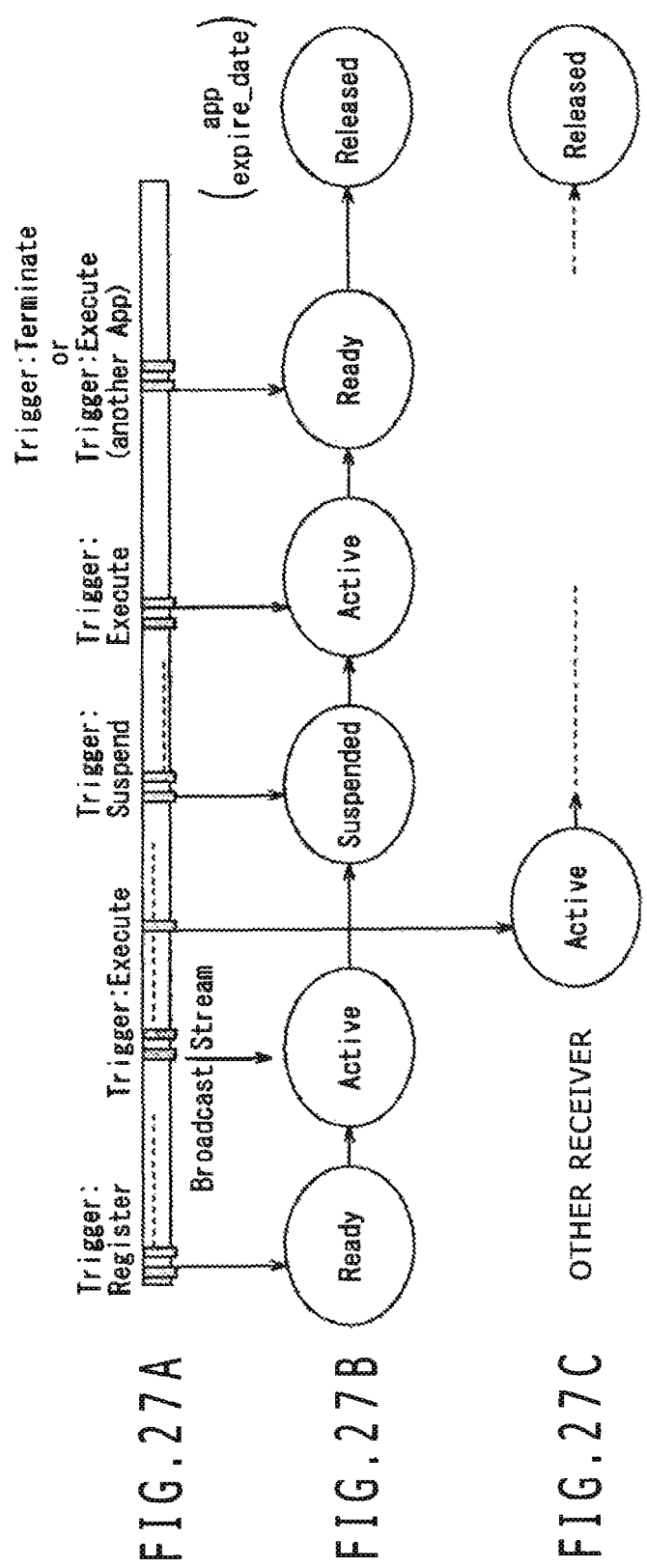

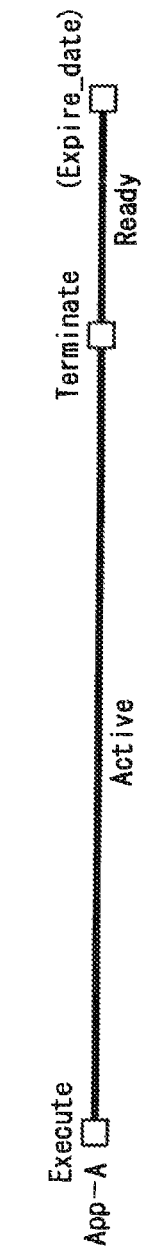
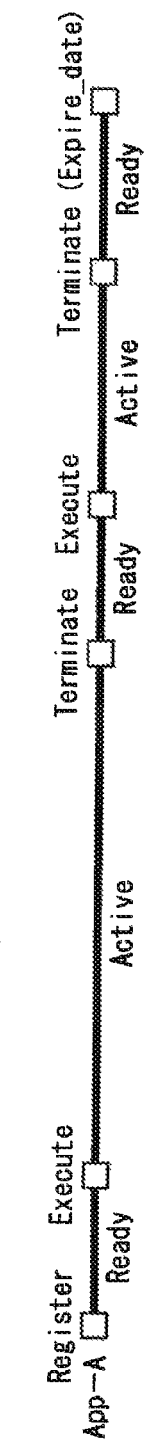
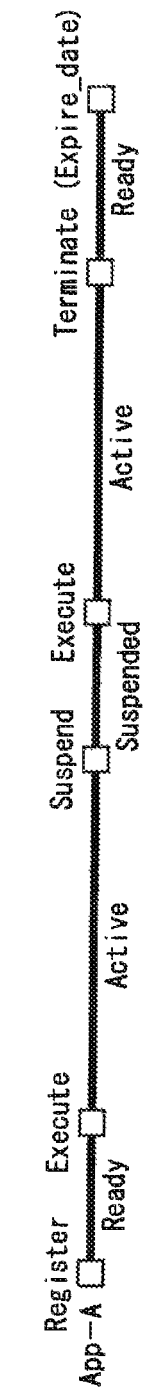
FIG. 28A  One-time use
FIG. 28B  Registration & several times use
FIG. 28C  One-time use with suspending

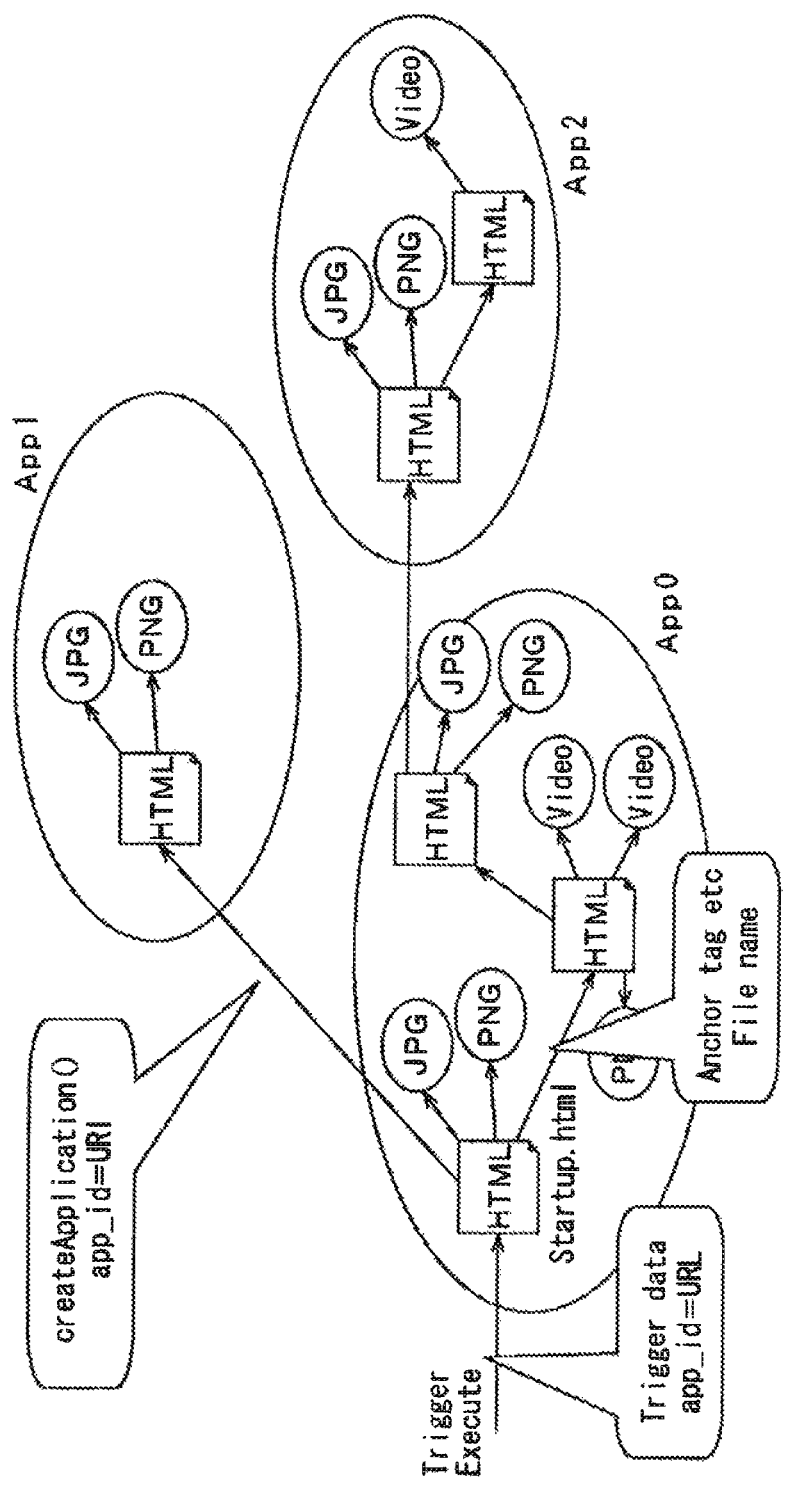

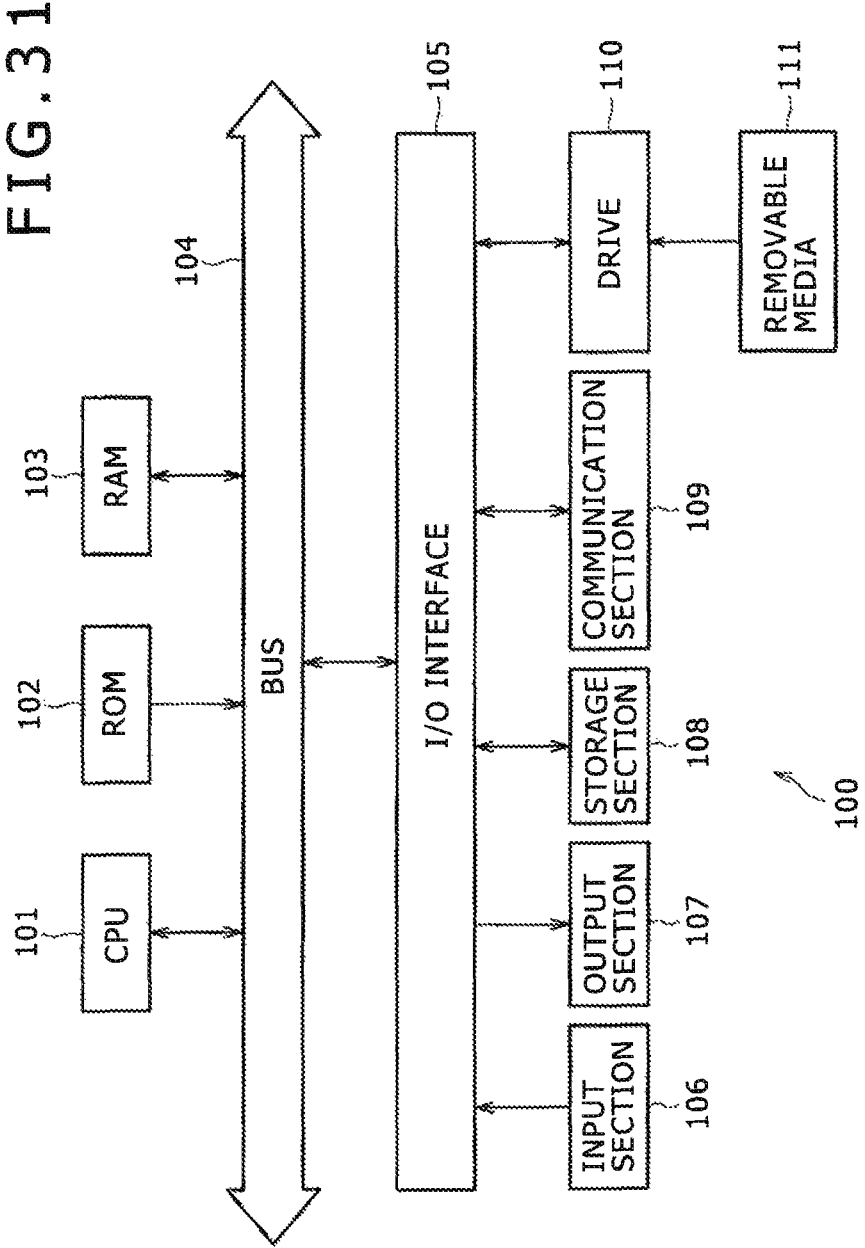

RECEIVER, RECEPTION METHOD, TRANSMITTER, TRANSMISSION METHOD, PROGRAM AND BROADCASTING SYSTEM

CROSS REFERENCE TO PRIOR APPLICATION

This application is a continuation of U.S. patent application Ser. No. 13/212,972 (filed on Aug. 18, 2011, which claims priority to Japanese Patent Application Nos. 2011-041801 (filed on Feb. 28, 2011) and 2010-190865 (filed on Aug. 27, 2010), which are all hereby incorporated by reference in their entirety.

BACKGROUND

The present disclosure relates to a receiver, reception method, transmitter, transmission method, program and broadcasting system, and more particularly, to a receiver, reception method, transmitter, transmission method, program and broadcasting system suitable for executing data broadcasting content in response to the progress of a program or CM (commercial message), for example, in digital television broadcasting.

Japan has pressed ahead with the digitalization of television broadcasting, making digital television broadcasting services such as digital terrestrial broadcasting and BS (broadcasting satellite) digital broadcasting widespread. Further, in digital television broadcasting such as digital terrestrial broadcasting, so-called data broadcasting is now available in addition to broadcasting of programs such as news, dramas and movies. The data broadcasting content allows to display, for example, information relating to the program being broadcast (e.g., cast and story) and that not relating to the program being broadcast (e.g., publicity of other programs, news, weather forecast and traffic information) (refer, for example, to Japanese Patent Laid-Open No. 2006-50237).

It should be noted that a band was set aside in advance for data broadcasting in the digital television broadcasting band when the digitalization of the television broadcasting began. The data broadcasting in Japan is implemented by broadcasting data broadcasting content using this band.

In digital television broadcasting in the United States, on the other hand, no band is set aside for data broadcasting unlike in the digital television broadcasting in Japan.

That is, the current digital television broadcasting band in the United States is occupied by the program video band, program audio band and control information band as illustrated in FIG. 1A, with no band provided for broadcasting data broadcasting content. In order to set aside a band adapted to broadcast data broadcasting content in the limited digital television broadcasting band, therefore, it is necessary, for example, to narrow the video and audio bands as illustrated in FIG. 1B.

SUMMARY

However, setting aside a band adapted to broadcast data broadcasting content by narrowing the video and audio bands will lead to degraded video and audio quality of the programs, thus making this approach far from realistic.

Further, even if a band is set aside for data broadcasting content by narrowing the video and audio bands, the size of data that can be transmitted is limited. This leads to lack of information for data broadcasting content. On the other hand, if the size of information is increased, it will take more time for the receiving side to receive necessary information.

In the meantime, the retransmission system of digital television programs using a CATV (cable TV) network is popular in the United States. However, this system may cause the problems described below.

FIG. 2 illustrates a configuration example of a retransmission system of digital television programs using a CATV network.

This retransmission system primarily includes a broadcasting apparatus 1, CATV retransmitter 2, CATV network 3, digital television receiver 4, settop box (STB) 5 and television receiver 6.

The broadcasting apparatus 1 provided, for example, in a broadcasting station broadcasts a digital television broadcasting signal using a terrestrial or satellite wave. The CATV retransmitter 2 provided, for example, in a cable TV station, receives broadcast digital television broadcasting, removes unnecessary information and adds CATV-specific information, thus retransmitting the resultant information, for example, to the digital television receiver 4 and settop box 5 via the CATV network 3.

The CATV retransmitter 2 includes a tuner 11, PID (process ID) filter 12, CATV-specific signal generation section 13, multiplexing section 14 and modulation section 15. The PID filter 12 filters the packet having a predetermined packet ID.

The tuner 11 receives digital television broadcasting signals for different channels and demodulates these signals, outputting the resultant TS (transport stream) to the PID filter 12. The PID filter 12 removes the packet with an ID matching the predetermined packet ID (packet not relating to AV (audio/visual) content as a program) from the TS, outputting the remaining packet to the multiplexing section 14. The CATV-specific signal generation section 13 generates a packet that includes information specific to the CATV station, outputting the packet to the multiplexing section 14. The multiplexing section 14 multiplexes the output of the PID filter 12 and that of the CATV-specific signal generation section 13, outputting the resultant signal to the modulation section 15. The modulation section 15 modulates the output of the multiplexing section 14 according to the modulation scheme suitable for the CATV network 3, retransmitting the resultant signal, for example, to the digital television receiver 4 and settop box 5 via the CATV network 3.

The CATV-compliant digital television receiver 4 receives and decodes the TS for digital television broadcasting retransmitted via the CATV network 3, displaying the resultant image and producing the resultant sound.

The CATV-compliant settop box 5 receives and decodes the TS for digital television broadcasting retransmitted via the CATV network 3, outputting the resultant video and audio signals to the television receiver 6, for example, via an HDMI cable. The television receiver 6 displays an image and produces a sound based on the video and audio signals supplied from the settop box 5, via an HDMI cable and the like.

As described above, the packet with an ID matching the predetermined packet ID (packet not relating to AV content as a program) is removed from the TS of the digital broadcasting signal by the PID filter 12 in the CATV retransmitter 2. Therefore, even if a band adapted to broadcast data broadcasting content is set aside in the broadcasting band as illustrated in FIG. 1B, the PID filter 12 may remove the packet including the data broadcasting content.

The present disclosure has been made in light of the foregoing, and it is desirable to implement data broadcasting content that can be executed in response to the progress of a television broadcasting program or CM without setting aside a data broadcasting band in the digital television broadcasting band.

A receiver according to a first mode of the present disclosure is a receiver adapted to receive transmitted AV content. The receiver includes an extraction section and control section. The extraction section extracts trigger information, transmitted together with the AV content, about control over an application program to be executed in response to the AV content. The control section controls the acquisition, registration or activation of the application program, the firing of an event in the active application program, or the suspension or termination of the active application program according to one of the following commands indicated by the extracted trigger information, namely, Pre-cache, Register, Execute, Inject_event, Suspend or Terminate.

If the extracted trigger information is the Suspend command, the control section can suspend the active application program and store information about the state of the application program at the time of suspension in a memory.

If the extracted trigger information is the Execute command and when suspended state information is stored in the memory that indicates the state of the application program to be activated at the time of suspension, the control section can resume the application program from the state in which the program was at the time of suspension based on the suspended state information.

If the extracted trigger information is the Pre-cache command, the control section can cause the application program to be acquired from the broadcasting signal of the AV content or a predetermined server based on the trigger information.

If the extracted trigger information is the Execute command and when the application program to be activated has yet to be acquired, the control section can cause the application program to be acquired from the broadcasting signal of the AV content or the predetermined server based on the trigger information.

If the extracted trigger information is the Register command, the control section can cause the application program to be acquired from the broadcasting signal of the AV content or the predetermined server and the program to be stored based on the trigger information. Then, the control section can manage the acquired application program so as to be associated with the expire date included in the trigger information.

If the extracted trigger information is the Register command, the control section can cause the application program to be acquired from the broadcasting signal of the AV content or the predetermined server and the program to be stored based on the identification information of the application program also serving as location information of the application program. Then, the control section can manage the acquired application program so as to be associated with the expire date included in the trigger information.

If the expire date of the registered application program is exceeded, the control section can cause the application program to be deleted.

If the extracted trigger information is the Register command, the control section can cause the application program to be acquired from the broadcasting signal of the AV content or the predetermined server and the program to be stored based on the trigger information. Then, the control section can manage the acquired application program so as to be also associated with the priority level included in the trigger information.

If the storage capacity is insufficient to store the application program when acquired, the control section can provide sufficient storage capacity by deleting, of the application programs that have been registered, the application program with a lower priority level than that to be acquired.

A reception method according to the first mode of the present disclosure is a reception method of a receiver adapted to receive transmitted AV content. The reception method includes an extraction step and control step. The extraction step extracts trigger information, transmitted together with the AV content, about control over an application program to be executed by the receiver in response to the AV content. The control step controls the acquisition, registration or activation of the application program, the firing of an event in the active application program, or the suspension or termination of the active application program according to one of the following commands indicated by the extracted trigger information, namely, Pre-cache, Register, Execute, Inject_event, Suspend or Terminate.

A program according to the first mode of the present disclosure is a program for controlling a receiver adapted to receive transmitted AV content. The program causes a computer of the receiver to perform a process including an extraction step and control step. The extraction step extracts trigger information, transmitted together with the AV content, about control over an application program to be executed in response to the AV content. The control step controls the acquisition, registration or activation of the application program, the firing of an event in the active application program, or the suspension or termination of the active application program according to one of the following commands indicated by the extracted trigger information, namely, Pre-cache, Register, Execute, Inject_event, Suspend or Terminate.

In the first mode of the present disclosure, trigger information, transmitted together with the AV content, is extracted about control over an application program to be executed in response to the AV content. The acquisition, registration or activation of the application program, the firing of an event in the active application program, or the suspension or termination of the active application program is controlled according to one of the following commands indicated by the extracted trigger information, namely, Pre-cache, Register, Execute, Inject_event, Suspend or Terminate.

A transmitter according to a second mode of the present disclosure is a transmitter adapted to transmit AV content. The transmitter includes a transmission section adapted to transmit, together with the AV content, trigger information about control over an application program to be executed by a receiver in response to the AV content. The trigger information indicates at least one of the following commands, namely, Pre-cache instructing the acquisition of the application program, Register instructing the registration thereof, Execute instructing the activation thereof, Inject_event instructing the firing of an event in the active application program, Suspend instructing the suspension of the active application program and Terminate instructing the termination of the active application program.

The transmission section can transmit the trigger information as contained in the adaptation field of the packet making up the transport stream for the AV content.

The transmission section can transmit the trigger information together with PCR (Program Clock Reference) as contained in the adaptation field of the packet making up the transport stream for the AV content.

The transmission section can transmit the trigger information as embedded in the image for the AV content.

A transmission method according to the second mode of the present disclosure is a transmission method of a transmitter adapted to transmit AV content. The transmission method includes a transmission step. The transmission step transmits, together with the AV content, trigger information about control over an application program to be executed by a receiver in response to the AV content. The trigger information indicates at least one of the following commands, namely, Pre-cache instructing the acquisition of the application program, Register instructing the registration thereof, Execute instructing the activation thereof, Inject_event instructing the firing of an event in the active application program, Suspend instructing the suspension of the active application program and Terminate instructing the termination of the active application program.

A program according to the second mode of the present disclosure is a program for controlling a transmitter adapted to transmit AV content. The program causes a computer of the transmitter to perform a process including a transmission step. The transmission step transmits, together with the AV content, trigger information about control over an application program to be executed by a receiver in response to the AV content. The trigger information indicates at least one of the following commands, namely, Pre-cache instructing the acquisition of the application program, Register instructing the registration thereof, Execute instructing the activation thereof, Inject_event instructing the firing of an event in the active application program, Suspend instructing the suspension of the active application program and Terminate instructing the termination of the active application program.

In the second mode of the present disclosure, trigger information is transmitted about control over an application program to be executed by a receiver in response to the AV content, together with the AV content. The trigger information indicates at least one of the following commands, namely, Pre-cache instructing the acquisition of the application program, Register instructing the registration thereof, Execute instructing the activation thereof, Inject_event instructing the firing of an event in the active application program, Suspend instructing the suspension of the active application program and Terminate instructing the termination of the active application program.

A broadcasting system according to a third mode of the present disclosure is a broadcasting system that includes a transmitter and receiver. The transmitter transmits AV content. The receiver receives the AV content. The transmitter includes a transmission section adapted to transmit, together with the AV content, trigger information about control over an application program to be executed by the receiver in response to the AV content. The receiver includes an extraction section and control section. The extraction section extracts trigger information, transmitted together with the AV content, about control over an application program to be executed in response to the AV content. The control section controls the acquisition, registration or activation of the application program, the firing of an event in the active application program, or the suspension or termination of the active application program according to one of the following commands indicated by the extracted trigger information, namely, Pre-cache, Register, Execute, Inject_event, Suspend or Terminate.

In the third mode of the present disclosure, the transmitter transmits trigger information about control over an application program to be executed by the receiver in response to the AV content, together with the AV content. Further, the receiver extracts trigger information, transmitted together with the AV content, about control over an application program to be executed in response to the AV content. Still further, the receiver controls the acquisition, registration or activation of the application program, the firing of an event in the active application program, or the suspension or termination of the active application program according to one of the following commands indicated by the extracted trigger information, namely, Pre-cache, Register, Execute, Inject_event, Suspend or Terminate.

The first mode of the present disclosure makes it possible to register or activate data broadcasting content, fire an event, or suspend, resume or terminate such content in response to the progress of a television broadcasting program or CM.

The second mode of the present disclosure makes it possible to register or activate data broadcasting content, fire an event, or suspend, resume or terminate such content in response to the progress of a television broadcasting program or CM without setting aside a data broadcasting band in the digital television broadcasting band.

The third mode of the present disclosure makes it possible to control data broadcasting content in response to the progress of a television broadcasting program or CM without setting aside a data broadcasting band in the digital television broadcasting band.

BRIEF DESCRIPTION OF THE DRAWINGS

FIG. 6 is a diagram illustrating the specific arrangement of trigger information in the PCR packet;

FIGS. 7A and 7B are diagrams illustrating examples of embedding trigger information in a video signal;

FIG. 8 is a diagram illustrating the items included in the trigger information for a Pre-cache command in a first embodiment;

FIG. 9 is a diagram illustrating the items included in the trigger information for an Execute command in the first embodiment;

FIG. 10 is a diagram illustrating the items included in the trigger information for an Inject_event command in the first embodiment;

FIG. 11 is a diagram illustrating the items included in the trigger information for a Suspend command in the first embodiment;

FIG. 12 is a diagram illustrating the items included in the trigger information for a Terminate command in the first embodiment;

FIG. 13 is a diagram illustrating an example of syntax of the trigger information in the first embodiment;

FIGS. 14A to 14G are diagrams illustrating examples of display when an application program is executed in response to the progress of a program or CM;

FIG. 19 is a diagram illustrating the items included in the trigger information for a Register command in a second embodiment;

FIG. 20 is a diagram illustrating the items included in the trigger information of the Execute command in the second embodiment;

FIG. 21 is a diagram illustrating the items included in the trigger information of the Inject_event command in the second embodiment;

FIG. 22 is a diagram illustrating the items included in the trigger information of the Suspend command in the second embodiment;

FIG. 23 is a diagram illustrating the items included in the trigger information of the Terminate command in the second embodiment;

FIG. 24 is a diagram illustrating an example of syntax of the trigger information in the second embodiment;

FIG. 26 is a second state transition diagram of the data broadcasting application in the receiver;

FIGS. 27A to 27C are diagrams illustrating the relationship between commands and state transitions;

FIGS. 28A to 28C illustrate life cycles of the data broadcasting application in the second embodiment;

FIG. 29 is a diagram illustrating the relationship between the multiple application programs;

FIG. 31 is a block diagram illustrating a configuration example of a computer.

DETAILED DESCRIPTION OF THE PREFERRED EMBODIMENTS

A detailed description will be given below of the best modes for carrying out the present disclosure (hereinafter referred to as embodiments) with reference to the accompanying drawings.

1. First Embodiment

[Configuration Example of the Broadcasting System]

Figure 3:
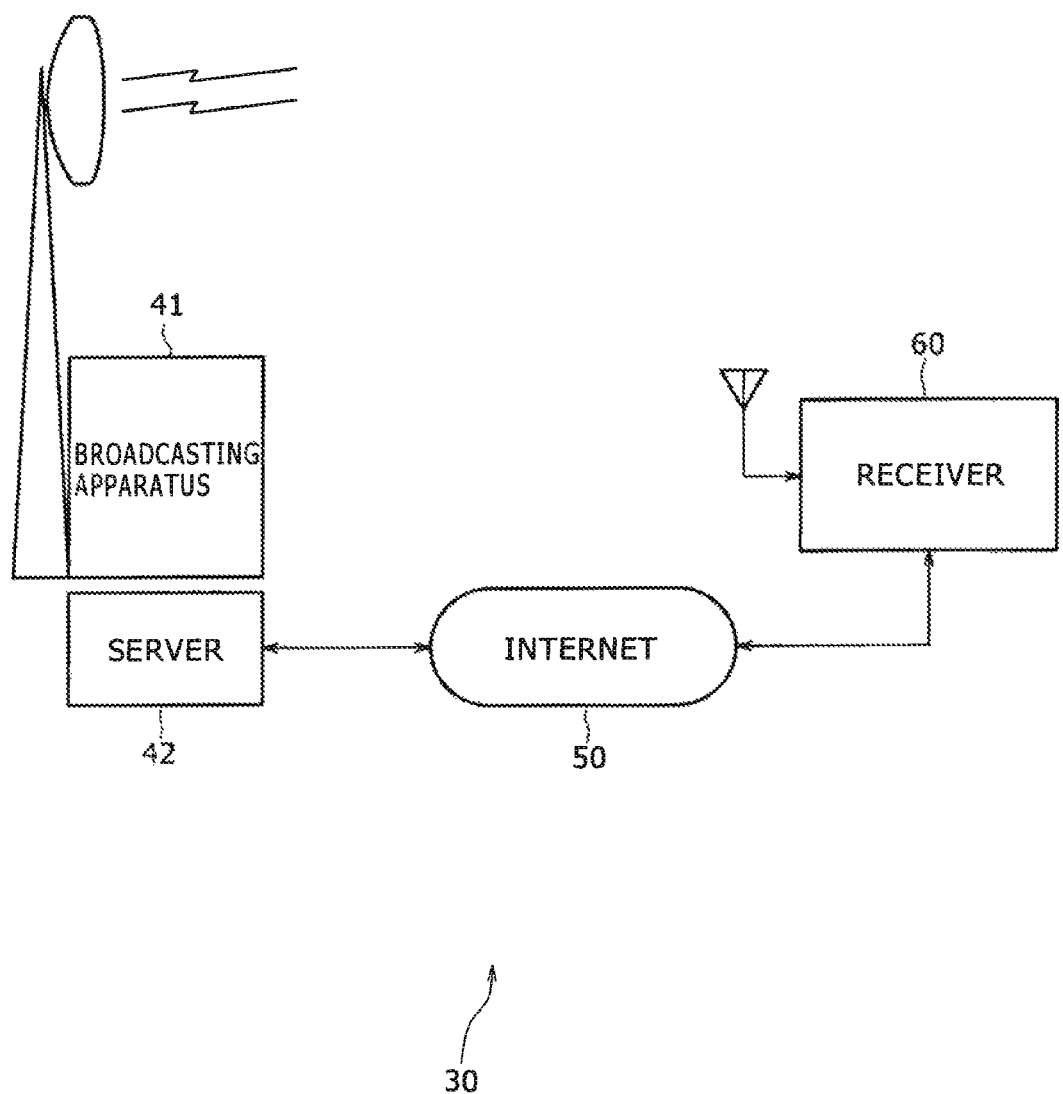
FIG. 3 is a diagram illustrating a configuration example of a broadcasting system according to an embodiment.

FIG. 3 is a diagram illustrating a configuration example of a broadcasting system according to an embodiment. A broadcasting system 30 is designed to implement data broadcasting content that can be executed in response to AV content such as program or CM when no band is set aside to broadcast data broadcasting content in the digital television broadcasting band as in the United States.

It should be noted that data broadcasting content is implemented as a result of the activation of an application program, supplied to a receiver, by the receiver. Therefore, data broadcasting content will be hereinafter also referred to as a data broadcasting application program or data broadcasting application. A data broadcasting application may include a single piece of program data or a program data group made up of a plurality of pieces of program data.

The broadcasting system 30 includes a broadcasting apparatus 41, server 42 and receiver 60. The broadcasting apparatus 41 and server 42 are provided at the broadcasting station. The receiver 60 is provided at the recipient.

The broadcasting apparatus 41 transmits a digital television broadcasting signal. Further, the same apparatus 41 transmits trigger information as included in the digital television broadcasting signal. Trigger information is a command relating to the operation of the data broadcasting content to be executed in response to AV content. More specifically, trigger information is contained in the transport stream (TS) of the digital television broadcasting signal or embedded in the video signal for transmission.

Trigger information includes not only information indicating the command type but also that indicating the acquirer of the data broadcasting application. Trigger information will be described in detail later.

The server 42 supplies a data broadcasting application in response to a request made from the receiver 60 that accessed the server 42 via the Internet 50.

The receiver 60 receives the digital television broadcasting signal from the broadcasting apparatus 41 and outputs the image and sound of the AV content to a monitor (not shown). Further, the receiver 60 accesses the server 42 via the Internet 50, thus acquiring data broadcasting content. It should be noted that the receiver 60 may be stand-alone or incorporated, for example, in a television receiver or video recorder.

[Configuration Example of the Receiver]

Figure 4:
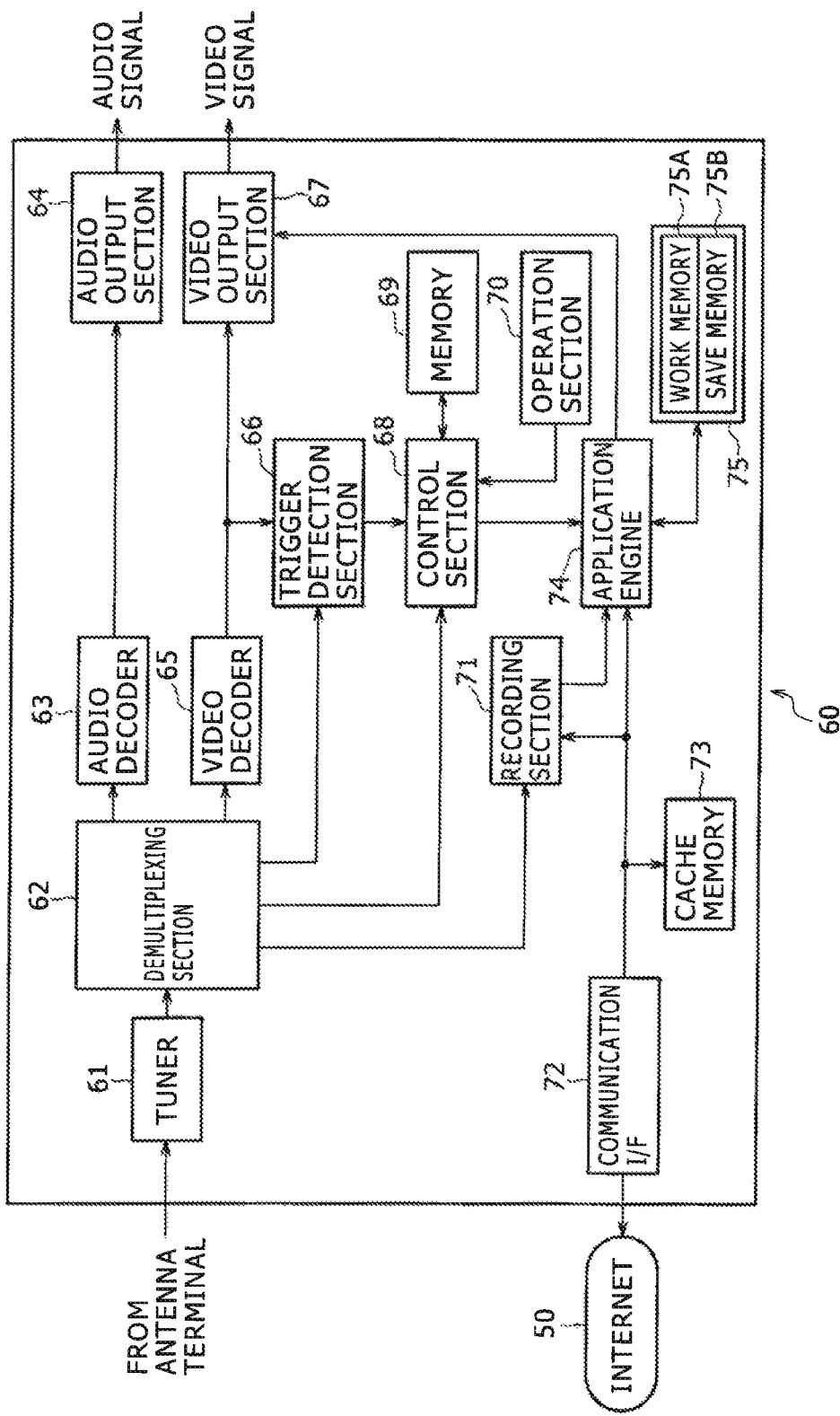
FIG. 4 is a block diagram illustrating a configuration example of a receiver according to an embodiment.

FIG. 4 illustrates a configuration example of a receiver 60. The receiver 60 includes a tuner 61, demultiplexing section 62, audio decoder 63, audio output section 64, video decoder 65, trigger detection section 66, video output section 67, control section 68, memory 69, operation section 70, recoding section 71, communication interface 72, cache memory 73, application engine 74 and application memory 75.

The tuner 61 receives and demodulates the digital television broadcasting signal for the channel selected by the user, outputting the resultant TS to the demultiplexing section 62. The demultiplexing section 62 separates the TS supplied from the tuner 61 into a coded audio signal, coded video signal and control signal, outputting each of these signals to the audio decoder 63, video decoder 65 or control section 68.

Further, the demultiplexing section 62 extracts a PCR packet including trigger information from the TS, outputting the PCR packet to the trigger detection section 66.

The audio decoder 63 decodes the supplied coded audio signal, outputting the resultant audio signal to the audio output section 64. The audio output section 64 outputs the supplied audio signal to the device (e.g., speaker) at the subsequent stage.

The video decoder 65 decodes the supplied coded video signal, outputting the resultant video signal to the trigger detection section 66 and video output section 67.

The trigger detection section 66 constantly monitors the supplied video signal, detecting the trigger information embedded in the video signal and outputting the trigger information to the control section 68 (this operation is not necessary if trigger information is contained only in the TS). Further, the trigger detection section 66 extracts trigger information from the PCR packet including trigger information supplied from the demultiplexing section 62, outputting the trigger information to the control section 68.

The video output section 67 outputs the video signal supplied from the video decoder 65 to the device (e.g., display) at the subsequent stage. Further, the video output section 67 combines the image of the data broadcasting content supplied from the application engine 74 with the video signal supplied from the video decoder 65, outputting the combined signal to the device at the subsequent stage.

The control section 68 executes the control program stored in the memory 69, thus controlling the receiver 60 as a whole. Further, the control section 68 controls the acquisition, registration or activation of a data broadcasting application, firing of an event, or suspension, resumption or termination of such an application based on the trigger information supplied from the trigger detection section 66.

The memory 69 stores the control program to be executed by the control section 68. This program can be updated based on the digital television broadcasting signal or the update data supplied via the Internet 50. In response to a variety of operations of the user, the operation section 70 notifies the control section 68 of the operation signals appropriate to the operations.

If a data broadcasting application is distributed using a digital television broadcasting signal, the recoding section 71 stores the downloaded data broadcasting application in a recording medium such as built-in harddisk.

The communication interface 72 connects to the server 42 via the Internet 50 under control of the application engine 74. The application engine 74 acquires the data broadcasting application from the server 42 via the communication interface 72 and the Internet 50 under control of the control section 68, storing the data broadcasting application in the cache memory 73.

The application engine 74 reads the data broadcasting application from the recoding section 71 or cache memory 73 and executes the same application under control of the control section 68.

The application memory 75 includes a work memory 75A and save memory 75B. The application engine 74 stores data about the active data broadcasting application (more specifically, data including, for example, hierarchical levels of displayed information) in the work memory 75A. Further, if the active data broadcasting application is suspended, the application engine 74 moves the data in the work memory 75A of the application memory 75 to the save memory 75B. Then, if the suspended data broadcasting application is resumed, the application engine 74 moves the data in the save memory 75B back to the work memory 75A, thus restoring the application to its original state before the application was suspended.

It should be noted that the two areas of the application memory 75 having the same size may alternately serve as the work memory 75A and save memory 75B. This eliminates the need to move the data between the work memory 75A and save memory 75B.

[Transmission Method of Trigger Information]

A description will be given next of how trigger information is transmitted.

Figure 5:
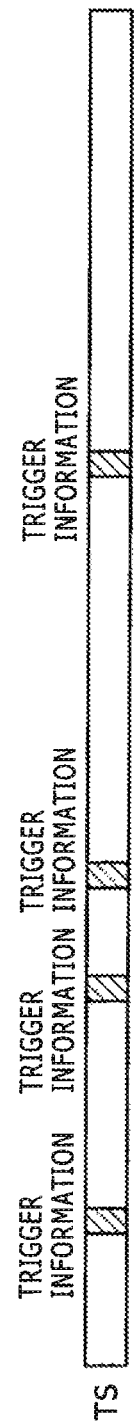
FIG. 5 is a diagram illustrating the concept of transmitting trigger information in PCR packets of a TS.

FIG. 5 illustrates the concept of transmitting trigger information as contained in PCR (Program Clock Reference) packets of a TS of a digital television broadcasting signal.

Figure 1:
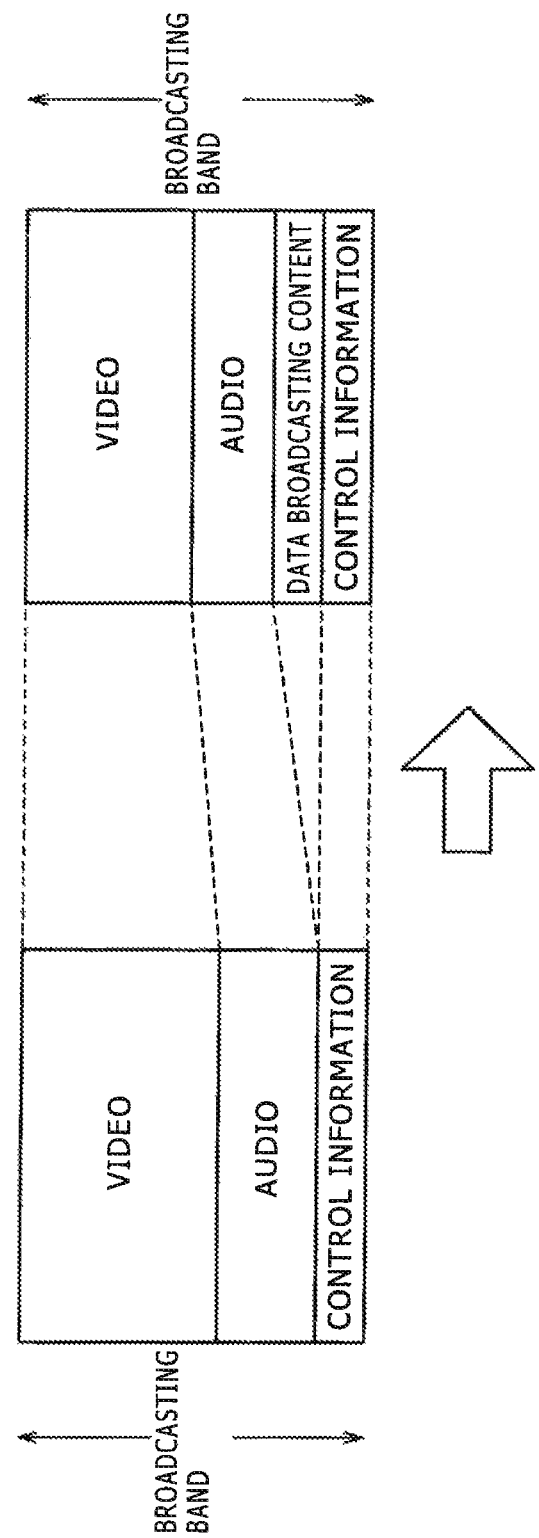
FIGS. 1A and 1B are diagrams illustrating the band of digital television broadcasting.
Figure 2:
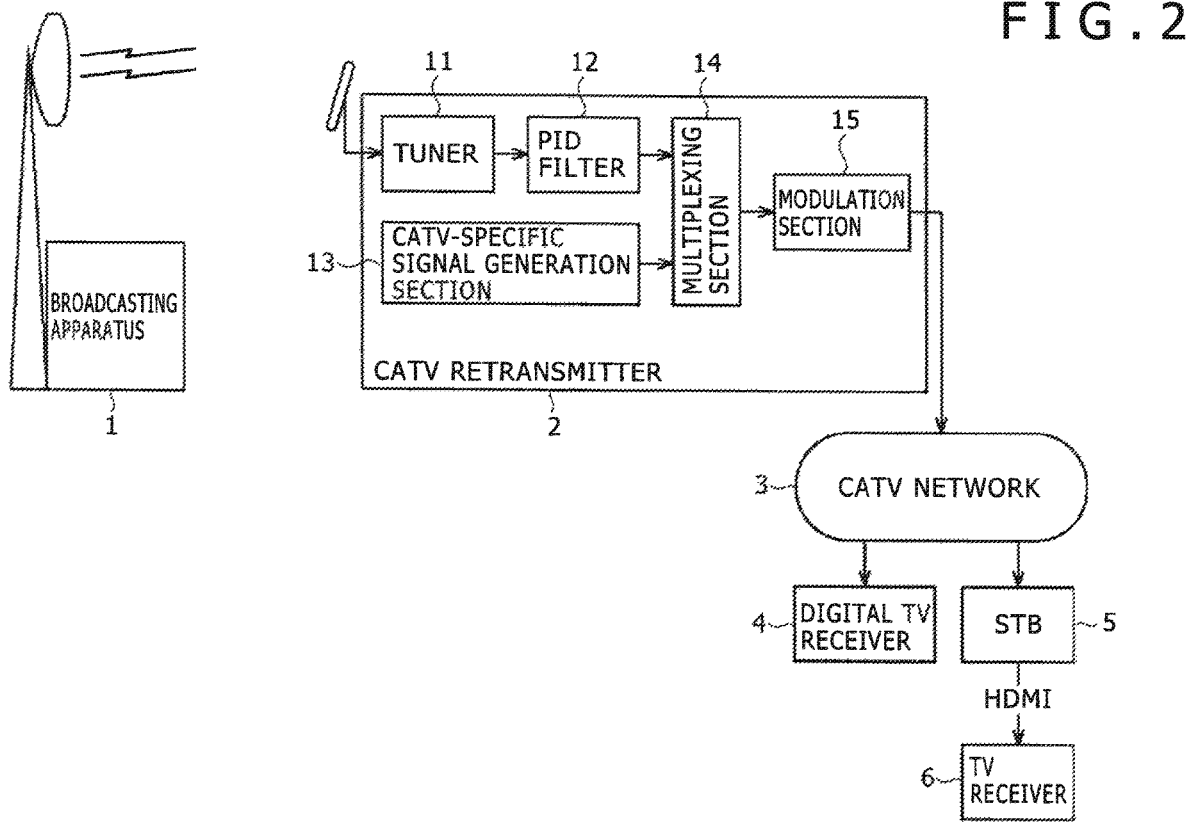
FIG. 2 is a diagram illustrating a configuration example of an existing CATV retransmission system.

As shown in FIG. 5, trigger information is not contained in all the PCR packets. Instead, trigger information is contained in PCR packets at timings appropriate for execution in response to AV content (e.g., programs and CMs). The PCR packets commonly pass through the PID filter 12 of the CATV retransmitter 2 as shown in FIG. 2, thus making it possible to notify a receiver using a CATV network (digital television receiver 4 shown in FIG. 2) of trigger information.

It should be noted that trigger information having the same content is transmitted continuously a plurality of times in consideration of possible radio disturbance and failure of the receiver 60 to receive trigger information (reception failure).

FIG. 6 illustrates the location of trigger information in a PCR packet. The PCR packet is a packet containing PCR in the adaptation field of a TS packet.

Trigger information (Trigger Info_descriptor) is contained in transport_private_data_byte following the PCR. It should be noted that if trigger information is contained, transport_private_data_flag of Various_flags preceding the PCR is set to "1."

Although FIGS. 5 and 6 illustrate a case in which trigger information is contained in a PCR packet of a TS, the location and transmission method of trigger information are not limited thereto. Alternatively, trigger information may be embedded in the video signal of AV content. FIGS. 7A and 7B illustrate two examples of embedding trigger information in a video signal.

FIG. 7A illustrates a case in which trigger information is translated into a two-dimensional barcode, and in which the barcode is overlaid at a predetermined position (bottom right corner in this case) on the image of the video signal. FIG. 7B illustrates a case in which trigger information is translated into a video code, and in which the video code is overlaid at several bottom lines on the image of the video signal. Trigger information shown in FIGS. 7A and 7B is detected by the trigger detection section 66 of the receiver 60.

In both of the examples shown in FIGS. 7A and 7B, the trigger information is overlaid on the image of AV content. Therefore, it is also possible to notify a receiver using a CATV network (television receiver 6 shown in FIG. 2) of trigger information.

On the other hand, trigger information (two-dimensional barcode or video code) is visible by the user of the receiver 60 in both of the examples shown in FIGS. 7A and 7B. However, if this is not preferred, it is only necessary to mask the trigger information on the image with the same pixels as those surrounding the trigger information.

[Detailed Description of Trigger Information]

A detailed description will be given next of trigger information. Trigger information is classified into five types according to the command included therein.

Two combinations of five different commands are proposed. The first combination (hereinafter referred to as the first embodiment) includes Pre_cache, Execute, Inject_event, Suspend and Terminate. The second combination (hereinafter referred to as the second embodiment) includes Register, Execute, Inject_event, Suspend and Terminate.

A description will be given first of the five different commands in the first embodiment. The second embodiment will be described with reference to FIG. 19 and beyond.

[First Example of Five Different Commands]

FIG. 8 illustrates the items included in the trigger information serving as the Pre-cache command. The Pre-cache command is designed to instruct the receiver 60 to acquire a data broadcasting application.

Trigger_id is information used to identify the trigger information in question. If the trigger information having the same content is transmitted a plurality of times, Trigger_id in all the pieces of trigger information is the same. Protocol_version indicates the protocol version of the trigger information in question. Command_code indicates the command type of the trigger information in question. In the case of FIG. 8, Command_code includes information indicating that the command is Pre-cache.

Trigger_validity is a server access distribution parameter N that indicates the probability for each of the receivers 60 that have received the trigger information in question to perform processes in accordance with the same trigger information. This value distributes the accesses of the plurality of receivers 60 to the server 42 to acquire the data broadcasting applications, thus preventing the concentration of accesses at a given time. In order to distribute the accesses of the possibly many servers 60 to the server 42 into four parts, for example, the same trigger information is transmitted four times. The server access distribution parameter N need only be set to "4" in the first trigger information, to "3" in the second trigger information, to "2" in the third trigger information, and to "1" in the fourth trigger information.

App_id is identification information of the data broadcasting application to be acquired that is associated with the trigger information in question. App_type indicates the type (e.g., HTML5 or java) of the data broadcasting application associated with the trigger information in question. App_url is the URL of the acquirer of the data broadcasting application.

Broadcast_App_flg, Downloaded_App_flag and Internet_App_flag are flags indicating the location of the data broadcasting application associated with the trigger information in question. Broadcast_App_flag is set to "1" when the data broadcasting application associated with the trigger information in question can be acquired from the digital television broadcasting signal. Downloaded_App_flag is set to "1" when the data broadcasting application associated with the trigger information in question has already been downloaded and when the same application can be acquired from a local storage (e.g., recording section 71). Internet_App_flag is set to "1" when the data broadcasting application associated with the trigger information in question can be acquired from the server 42 via the Internet 50.

FIG. 9 illustrates the items included in the trigger information serving as the Execute command. The Execute command is designed to instruct the receiver 60 to activate a data broadcasting application.

Trigger_id, Protocol_version, Command_code, Trigger_validity, App_id, App_type, App_url, Broadcast_App_flag, Downloaded_App_flag and Internet_App_flag are the same as those in the trigger information serving as the Pre-cache command shown in FIG. 8. It should be noted, however, that Command_code includes information indicating that the command is Execute.

App_life_scope indicates the limit within which the execution of the data broadcasting application is continued without terminating it, for example, if the channels are changed. App_expire_date indicates the date when the active data broadcasting application is terminated even if the Terminate command is not received.

FIG. 10 illustrates the items included in the trigger information serving as the Inject_event command. The Inject_event command is designed to cause the receiver 60 to fire an event in an active data broadcasting application.

Trigger_id, Protocol_version, Command_code, Trigger_validity, App_id and App_type are the same as those in the trigger information serving as the Pre-cache command shown in FIG. 8. It should be noted, however, that Command_code includes information indicating that the command is Inject_event.

Event_id is identification information about the event to be fired in the data broadcasting application specified by the App_id. Event Embedded Data includes data referenced when the event is fired.

FIG. 11 illustrates the items included in the trigger information serving as the Suspend command. The Suspend command is designed to cause the receiver 60 to suspend an active data broadcasting application.

Trigger_id, Protocol_version, Command_code, Trigger_validity, App_id and App_type are the same as those in the trigger information serving as the Pre-cache command shown in FIG. 8. It should be noted, however, that Command_code includes information indicating that the command is Suspend.

FIG. 12 illustrates the items included in the trigger information serving as the Terminate command. The Terminate command is designed to cause the receiver 60 to terminate an active data broadcasting application.

Trigger_id, Protocol_version, Command_code, Trigger_validity, App_id and App_type are the same as those in the trigger information serving as the Pre-cache command shown in FIG. 8. It should be noted, however, that Command_code includes information indicating that the command is Terminate.

FIG. 13 illustrates an example of syntax of the trigger information as one of the above commands. It should be noted that any syntax can be used for trigger information and that the syntax thereof is not limited to the example shown in FIG. 13.

[Outline of the Operation of the Receiver 60]

A description will be given next of the operation of the receiver 60 in accordance with trigger information.

FIGS. 14A to 14G illustrate the changes of the display screen when the receiver 60 executes a data broadcasting application for AV content (e.g., program or CM).

For example, a program ("7 O'clock News" in this case) is broadcast as illustrated in FIG. 14A. When the topic of the program moves on to economic information, trigger information of the Execute command for the data broadcasting application associated with the program is transmitted. When this information is received by the receiver 60, the data broadcasting application is activated. As a result, an icon ("Stock" in this case) appears on the screen displaying the program so as to notify the user that the data broadcasting application is ready to be displayed as illustrated in FIG. 14B.

When the user selects the icon, the data broadcasting application produces a display (stock price information in this case) on the screen as illustrated in FIG. 14C. As described above, the data broadcasting application produces a display only when the user selects the on-screen icon. This avoids possible inconvenience to those users who do not need any display produced by the data broadcasting application.

When the program moves on to a new topic (sports information in this case), the trigger information of the Inject_event command is transmitted in response thereto. When this information is received by the receiver 60, an event is fired, thus changing the screen displayed by the data broadcasting application, for example, to that shown in FIG. 14D (game result information in this case).

Then, before a CM is broadcast, the trigger information of the Suspend command for the active data broadcasting application associated with the program is transmitted. When this information is received by the receiver 60, the data broadcasting application associated with the program is suspended. Then, the trigger information of the Execute command for the data broadcasting application associated with the CM is transmitted. When this information is received by the receiver 60, the data broadcasting application associated with the CM is activated. As a result, an icon ("Apply for prize" in this case) appears on the screen displaying the CM so as to prompt the user to display the data broadcasting application associated with the CM as illustrated in FIG. 14E.

When the user selects the icon, the data broadcasting application associated with the CM produces a display (display for application for a prize in this case) on the screen.

After the CM ends, the trigger information of the Execute command for the data broadcasting application associated with the program is transmitted in response to the resumption of the program. When this information is received by the receiver 60, the display of the data broadcasting application associated with the CM disappears, allowing for the data broadcasting application associated with the program to be resumed from the state in which the application was at the time of suspension.

Then, when the program ends, the trigger information of the Terminate command for the data broadcasting application associated with the program is transmitted in response thereto. When this information is received by the receiver 60, the data broadcasting application is terminated, allowing for the display of the data broadcasting application to disappear from the screen and only the image of the program to remain on the screen.

It should be noted that the display of the data broadcasting application may be overlaid, for example, on the program display rather than providing an area for the display of the data broadcasting application by shrinking the program display as illustrated in FIGS. 14A to 14G.

[Handling of Trigger Information]

A description will be given next of the handling of trigger information when the receiver 60 receives trigger information with reference to FIG. 15.

Figure 15:
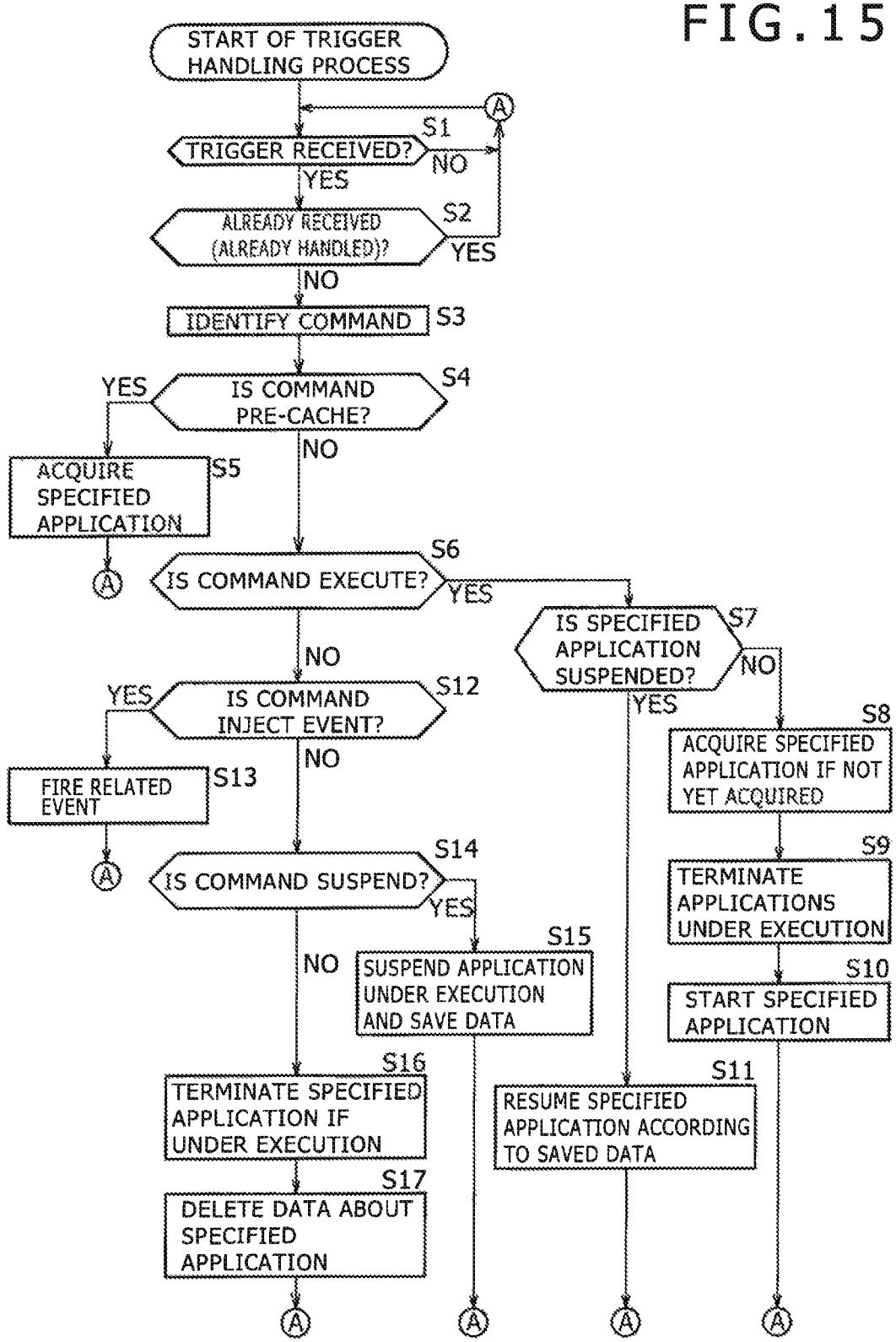
FIG. 15 is a flowchart describing the handling of trigger information.

FIG. 15 is a flowchart describing the handling of trigger information. This handling of trigger information is repeated when the user watches a television program, that is, while the digital television broadcasting signal is received.

In step S1, the trigger detection section 66 waits until a PCR packet including trigger information is supplied from the demultiplexing section 62 or until trigger information is detected from a video signal output from the video decoder 65. The process proceeds to step S2 when a PCR packet including trigger information is supplied or trigger information is detected from a video signal.

In step S2, the trigger detection section 66 outputs trigger information to the control section 68. The control section 68 reads Trigger_id from the trigger information to determine whether the process steps from step S3 and beyond have already been performed in response to the trigger information in question. When it is determined that the process steps from step S3 and beyond have already been performed, the process returns to step S1 to repeat the steps from there onward. In contrast, if it is determined that the process steps from step S3 and beyond have not been performed, the process proceeds to step S3.

In step S3, the control section 68 reads Command_code from the trigger information to determine which of Pre-cache, Execute, Inject_event, Suspend and Terminate is indicated by the trigger information in question.

In step S4, the control section 68 determines whether the command identified in step S3 is Pre-cache. When the identified command is Pre-cache, the process proceeds to step S5.

In step S5, the control section 68 causes a data broadcasting application, identified by the App_id of the trigger information in question, to be acquired. More specifically, when Broadcast_App_flag is "1" in the trigger information in question, the data broadcasting application identified by App_id is acquired from the television broadcasting signal and recorded to the recording section 71. When Downloaded_App_flag is "1" in the trigger information in question, the data broadcasting application identified by App_id is acquired from the recording section 71, i.e., the local storage. When Internet_App_flag is "1" in the trigger information in question, the data broadcasting application identified by App_id is acquired from the server 42 via the Internet 50 and recorded to the cache memory 73. It should be noted that if two or more of Broadcast_App_flag, Downloaded_App_flag and Internet_App_flag are set to "1," it is possible to acquire the data broadcasting application identified by App_id of the trigger information in question according to the convenience of the receiver 60. Then, the process returns to step S1 to repeat the steps from there onward.

If it is determined in step S4 that the command identified in step S3 is not Pre-cache, the process proceeds to step S6. In step S6, the control section 68 determines whether the command identified in step S3 is Execute. When it is determined that the identified command is Execute, the process proceeds to step S7.

In step S7, the application engine 74 determines, under control of the control section 68, whether the data broadcasting application identified by App_id of the trigger information in question is suspended. More specifically, the application engine 74 determines that the data broadcasting application identified by App_id is suspended when data indicating the suspension is saved in the save memory 75B.

If it is determined in step S7 that the data broadcasting application identified by App_id is not suspended, the process proceeds to step S8. In step S8, the application engine 74 acquires, under control of the control section 68, the data broadcasting application identified by App_id if the same application has yet to be acquired (if the same application is not stored in the recording section 71 or cache memory 73).

In step S9, the application engine 74 terminates, under control of the control section 68, any active data broadcasting application.

In step S10, the application engine 74 activates, under control of the control section 68, the data broadcasting application identified by App_id. Then, the process returns to step S1 to repeat the steps from there onward.

It should be noted that when it is determined in step S7 that the data broadcasting application identified by App_id is suspended, the process proceeds to step S11. In step S11, the application engine 74 moves, under control of the control section 68, the data in the save memory 75B to the work memory 75A and activates the data broadcasting application identified by App_id. This allows for the suspended data broadcasting application identified by App_id to be resumed from the state in which the application was at the time of suspension. Then, the process returns to step S1 to repeat the steps from there onward.

If it is determined in step S6 that the command identified in step S3 is not Execute, the process proceeds to step S12. In step S12, the control section 68 determines whether the command identified in step S3 is Inject_event. When it is determined that the identified command is Inject_event, the process proceeds to step S13.

In step S13, the control section 68 controls the application engine 74 to fire (execute) the event matching the Event_id of the trigger information in the active data broadcasting application only when App_id of the trigger information in question agrees with App_id of the active application. Then, the process returns to step S1 to repeat the steps from there onward.

If it is determined in step S12 that the command identified in step S3 is not Inject_event, the process proceeds to step S14. In step S14, the control section 68 determines whether the command identified in step S3 is Suspend. When it is determined that the identified command is Suspend, the process proceeds to step S15.

In step S15, the application engine 74 saves, under control of the control section 68, the data indicating the state of the active data broadcasting application (i.e., data currently written to the work memory 75A, including information indicating the hierarchical level of displayed information if the information to be displayed has a hierarchy) to the save memory 75B. Then, the process returns to step S1 to repeat the steps from there onward.

If it is determined in step S14 that the command identified in step S3 is not Suspend, the command identified in step S3 is Terminate. Therefore, the process proceeds to step S16. In step S16, the application engine 74 terminates, under control of the control section 68, the data broadcasting application identified by App_id if the same application is active. In step S17, the application engine 74 deletes, under control of the control section 68, the data about the data broadcasting application identified by App_id from the work memory 75A and save memory 75B and deletes the same application from the recording section 71 or cache memory 73. Then, the process returns to step S1 to repeat the steps from there onward.

This completes the description of the handling of trigger information. The above handling of trigger information makes it possible, for example, to activate a data broadcasting application, fire an event in the same application or terminate the same application in response to AV content (e.g., program or CM) for television broadcasting. Further, it is also possible to suspend an active data broadcasting application, execute and terminate another data broadcasting application and then resume the suspended data broadcasting application from the state in which the application was at the time of suspension.

[Operation Scenario]

Figure 16:
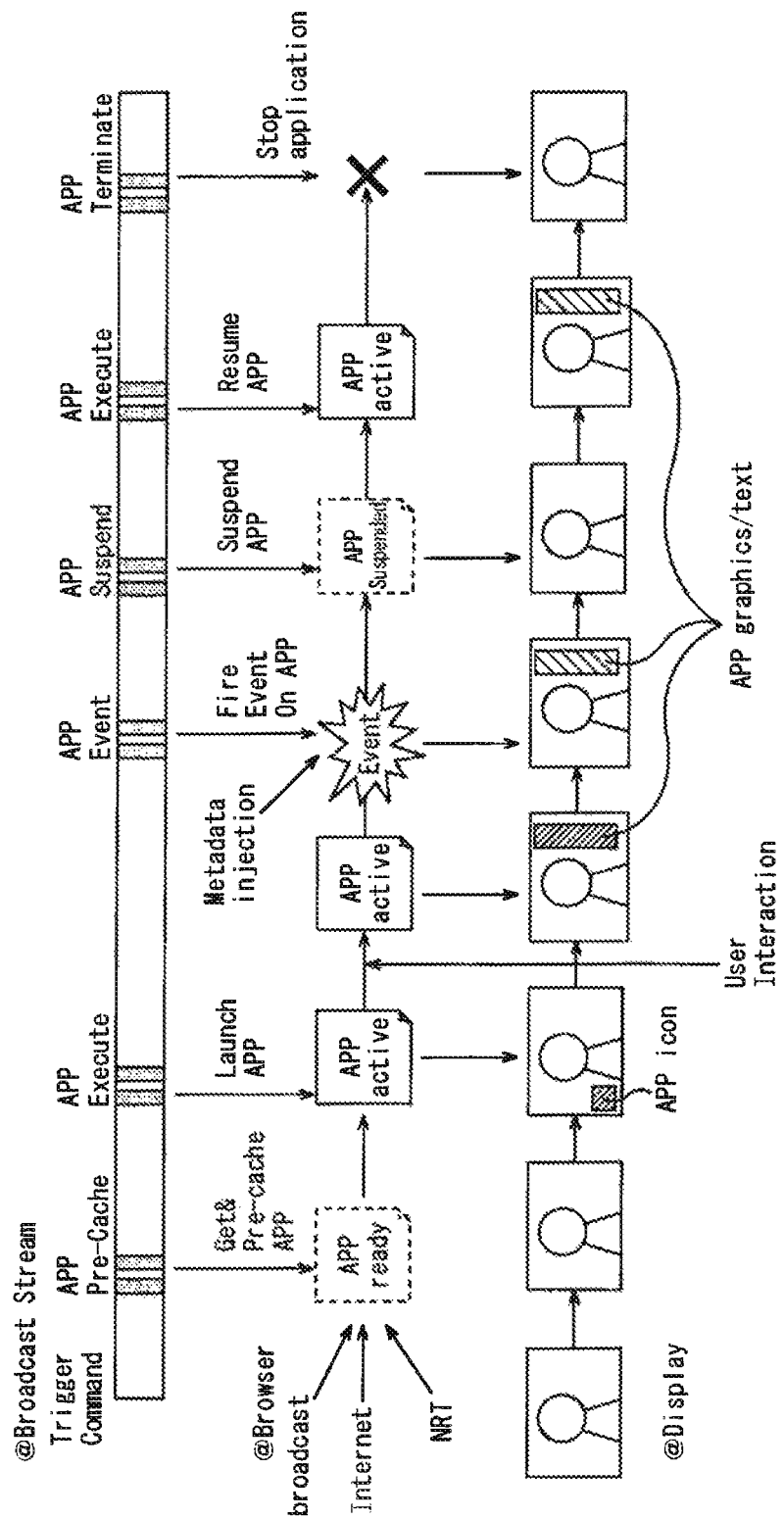
FIG. 16 is a diagram illustrating an example of operation scenario of the data broadcasting application.

The above handling of trigger information makes it possible to use a data broadcasting application as illustrated in FIG. 16.

FIG. 16 illustrates an example of operation scenario of a data broadcasting application.

When the broadcasting apparatus 41 transmits trigger information of the Pre-cache command to instruct the acquisition of the data broadcasting application associated with a program in response to the progress of the program, the receiver 60 that receives the trigger information acquires the data broadcasting application.

Next, when the broadcasting apparatus 41 transmits trigger information of the Execute command of the data broadcasting application associated with the program in response to the progress of the program, the receiver 60 that receives the trigger information activates the data broadcasting application. As a result of the activation of the application, an icon appears on the image of the program to indicate that the data broadcasting application is ready to produce a display.

When the user selects this icon, a display of the data broadcasting application is superposed on the image of the program on the screen.

When the broadcasting apparatus 41 transmits trigger information of the Inject_event command of the data broadcasting application associated with the program in response to the progress of the program, the receiver 60 that receives the trigger information fires an event in the active data broadcasting application (e.g., changes the display).

Then, when the broadcasting apparatus 41 transmits trigger information of the Suspend command of the data broadcasting application at a predetermined timing, the receiver 60 that receives the trigger information suspends the active data broadcasting application (related data is stored in the save memory 75B). When the broadcasting apparatus 41 transmits trigger information of the Execute command of the data broadcasting application, the receiver 60 that receives the trigger information resumes the suspended data broadcasting application.

Further, when the broadcasting apparatus 41 transmits trigger information of the Terminate command in response to the end of the program, the receiver 60 that receives the trigger information terminates the active data broadcasting application.

[First Example of State Transitions of the Data Broadcasting Application]

Figure 17:
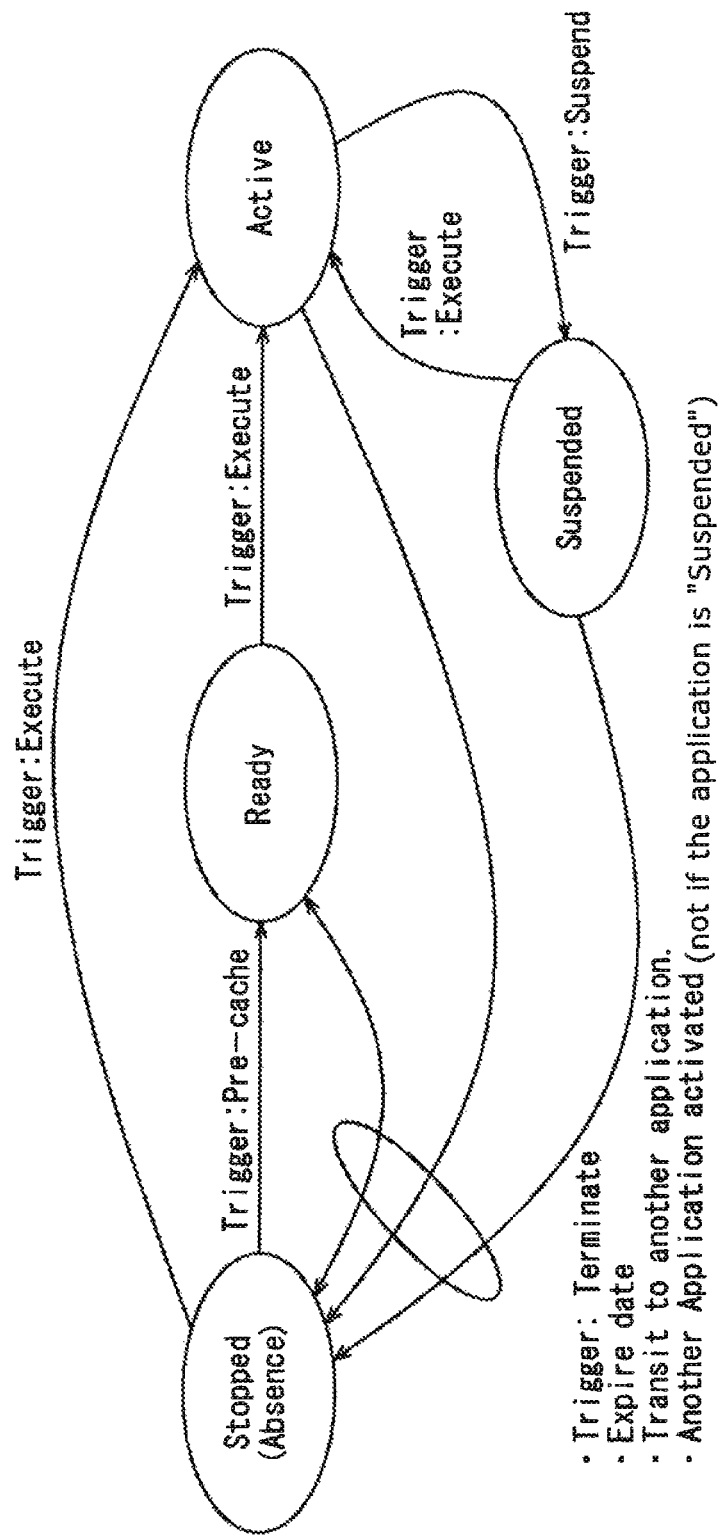
FIG. 17 is a first state transition diagram of the application program in the receiver.

FIG. 17 is a state transition diagram of a data broadcasting application adapted to run in the receiver 60 in response to each of Pre-cache, Execute, Inject_event, Suspend and Terminate, i.e., a first example of the five different commands.

As illustrated in FIG. 17, the data broadcasting application is defined to be in one of four different states, namely, Stopped, Ready, Active and Suspended.

The Stopped state refers to a state in which the data broadcasting application has yet to be acquired by the receiver 60. The Ready state refers to a state in which the data broadcasting application has already been acquired by the receiver 60 but has yet to be activated. The Active state refers to a state in which the data broadcasting application is active. The Suspended state refers to a state in which the data broadcasting application has been suspended and the information indicating the state in which the application was at the time of suspension is stored in the save memory 75B.

When the data broadcasting application is in the Stopped state (when the application has yet to be acquired by the receiver 60), the application makes a transition to the Ready state if the receiver 60 receives trigger information of the Pre-cache command and acquires the data broadcasting application in accordance with the Pre-cache command.

When the data broadcasting application is in the Ready state, the application makes a transition to the Active state if the receiver 60 receives trigger information of the Execute command and activates the data broadcasting application in accordance with the Execute command.

On the other hand, when the data broadcasting application is in the Stopped state (when the application has yet to be acquired by the receiver 60), the application makes a transition to the Active state if the receiver 60 receives trigger information of the Execute command and activates the application in accordance with the Execute command.

When the data broadcasting application is in the Active state, the application makes a transition to the Suspended state if the receiver 60 receives trigger information of the Suspend command and suspends the active data broadcasting application in accordance with the Suspend command.

When the data broadcasting application is in the Suspended state, the application makes a transition to the Active state if the receiver 60 receives trigger information of the Execute command and activates the suspended data broadcasting application in accordance with the Execute command.

When the data broadcasting application is in the Ready, Active or Suspended state, the data broadcasting application makes a transition to the Stopped state if the receiver 60 receives trigger information of the Terminate command and terminates the active data broadcasting application in accordance with the Terminate command. It should be noted that the data broadcasting application makes a transition to the Stopped state not only based on the trigger information of the Terminate command but also if the expire date indicated by App_expire_date is exceeded, if other data broadcasting program is executed or if the limit for changing the channels indicated by App_life_scope is exceeded.

[State Transitions of a Plurality of Data Broadcasting Applications]

A description will be given next of the state transitions of a plurality of data broadcasting applications sequentially executed by the receiver 60.

Figure 18:
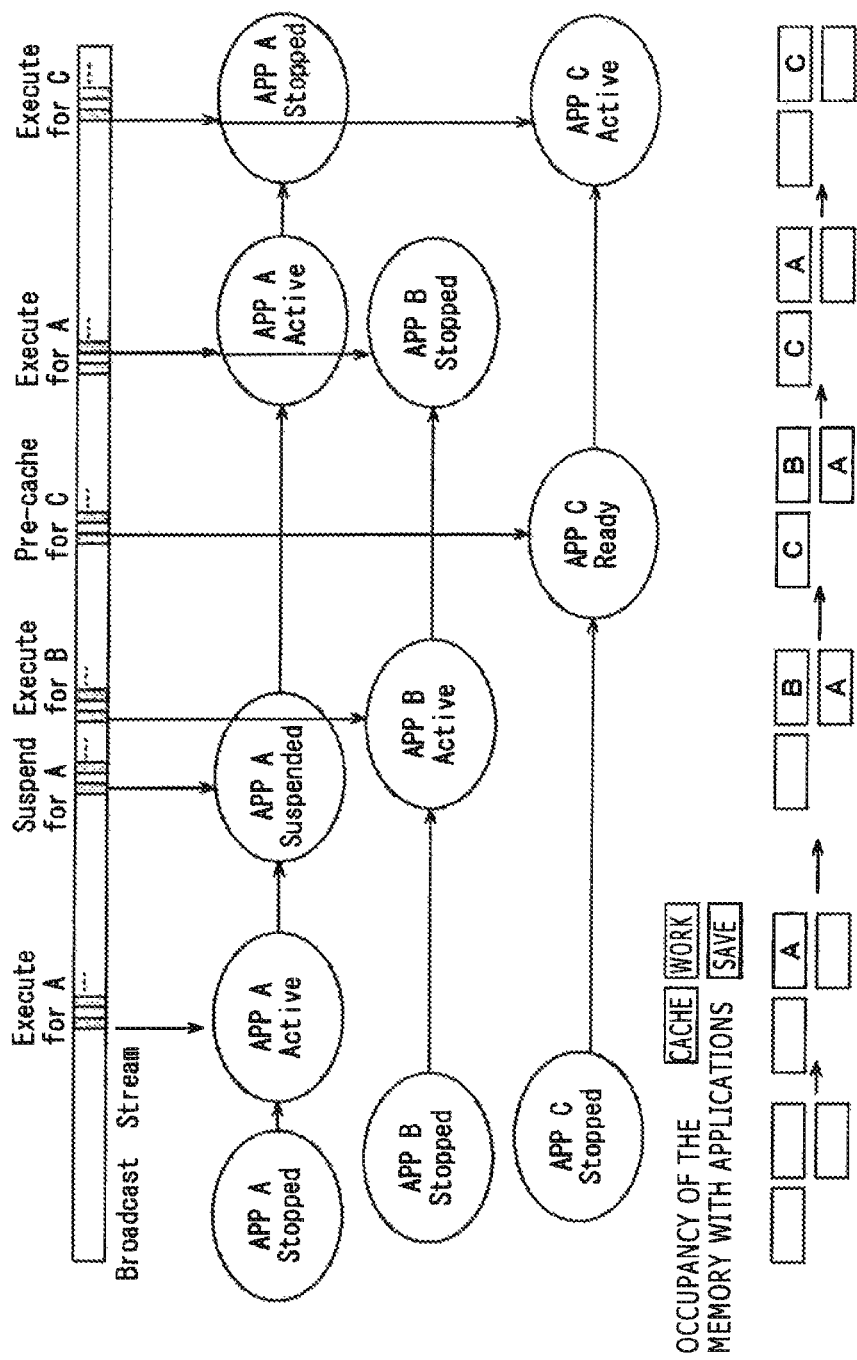
FIG. 18 is a diagram illustrating an example of operation scenario when the plurality of data broadcasting applications are controlled at the same time.

FIG. 18 illustrates an example of operation scenario when a plurality of data broadcasting applications are executed sequentially. The three data broadcasting applications will be hereinafter referred to as the data broadcasting applications A, B and C.

When a program begins, the data broadcasting applications A, B and C are all in the Stopped state. Following the reception of the Execute command for the data broadcasting application A, the receiver 60 acquires and activates the same application A, bringing the same application A into the Active state. At this time, the data about the data broadcasting application A is written to the work memory 75A.

Next, when the receiver 60 receives the Suspend command for the data broadcasting application A, the data about the data broadcasting application A is moved from the work memory 75A to the save memory 75B, bringing the data broadcasting application A into the Suspended state. Then, following the reception of the Execute command for the data broadcasting application B, the receiver 60 acquires and activates the data broadcasting application B, bringing the same application B into the Active state. At this time, the data about the data broadcasting application B is written to the work memory 75A.

When the receiver 60 receives the Pre-cache command for the data broadcasting application C while the data broadcasting application B is in the Active state, the receiver 60 acquires the data broadcasting application C, bringing the data broadcasting application C into the Ready state.

Next, when the receiver 60 receives the Execute command for the data broadcasting application A, the data broadcasting application A is in the Stopped state. Therefore, the data about the data broadcasting application A is moved from the save memory 75B to the work memory 75A, thus resuming the data broadcasting application A. On the other hand, the data broadcasting application B is terminated.

Then, following the reception of the Execute command for the data broadcasting application C in the Ready state, the receiver 60 reads and activates the data broadcasting application C, bringing the data broadcasting application C into the Active state. The data about the data broadcasting application C is written to the work memory 75A. On the other hand, the data broadcasting application A is terminated.

As described above, the plurality of data broadcasting applications can be executed sequentially by the receiver 60. Moreover, the suspended data broadcasting application can be resumed from the state in which the application was at the time of suspension.

2. Second Embodiment

[Second Example of the Five Different Commands]

A description will be given next of a second embodiment. As described earlier, the five different commands in the second embodiment include Register, Execute, Inject_event, Suspend and Terminate.

FIG. 19 illustrates the items included in the trigger information serving as the Register command in the second embodiment. The Register command is designed to instruct the receiver 60 to acquire and register a data broadcasting application.

That is, the Register command is similar to the Pre-cache command in the first embodiment in that the Register command instructs the receiver 60 to acquire a data broadcasting application. However, the Register command differs from the Pre-cache command in the first embodiment in that the Register command additionally instructs the receiver 60 to register a data broadcasting application. Here, the term "registration of a data broadcasting application" refers to the storage of the priority level (Persistent_priority) and expire date (Expire_date) of an acquired data broadcasting application so as to be associated with the data broadcasting application. The stored data broadcasting application is managed by the control section 68 in accordance with its priority level and expire date (described in detail later).

Trigger_id, Protocol_version, Command_code, Trigger_validity, App_type and App_life_scope are the same as those in the trigger information serving as the Pre-cache command shown in FIG. 8. It should be noted, however, that Command_code includes information indicating that the command is the Register command.

App_id in the second embodiment is identification information of the data broadcasting application to be acquired that is associated with the trigger information in question and also indicates the URL of the acquirer (server 42 in this case) of the data broadcasting application. In other words, the acquirer of the data broadcasting application is also used as the identification information of the same application, i.e., App_id. Therefore, the trigger information serving as the Register command does not have App_url included in the trigger information serving as the Pre_cache command shown in FIG. 8. It should be noted, however, that App_url may be included in the trigger information serving as the Register command.

Persistent_priority indicates the priority level for acquiring and storing an associated data broadcasting application. In this case, two bits are assigned to Persistent_priority. As a result, one of four different priority levels can be attached. If the recording section 71 does not have enough capacity to acquire and store the associated data broadcasting application, an application with a lower priority level than the associated data broadcasting application is deleted from the recording section 71 to provide enough storage capacity. If the recording section 71 stores no application with a lower priority level than the associated data broadcasting application, the associated data broadcasting application is not acquired. It should be noted, however, that the associated data broadcasting application may be acquired and temporarily stored in the cache memory 73.

Expire_date indicates the expire date of the associated data broadcasting application stored in the recording section 71. The associated data broadcasting application is deleted from the recording section 71 if the expire date is exceeded.

FIG. 20 illustrates the items included in the trigger information serving as the Execute command in the second embodiment. The Execute command is designed to instruct the receiver 60 to activate a data broadcasting application.

The items included in the trigger information serving as the Execute command are the same as those in the trigger information serving as the Register command shown in FIG. 19. It should be noted, however, that Command_code includes information indicating that the command is the Execute command.

FIG. 21 illustrates the items included in the trigger information serving as the Inject_event command in the second embodiment. The Inject_event command is designed to cause the receiver 60 to fire an event in an active data broadcasting application.

The items included in the trigger information serving as the Inject_event command in the second embodiment are the same as those in the first embodiment shown in FIG. 10. It should be noted, however, that the Inject_event command in the second embodiment differs from its counterpart in the first embodiment in the number of bits assigned to App_id.

FIG. 22 illustrates the items included in the trigger information serving as the Suspend command. The Suspend command is designed to cause the receiver 60 to suspend an active data broadcasting application.

The items included in the trigger information serving as the Suspend command in the second embodiment are the same as those in the first embodiment shown in FIG. 11. It should be noted, however, that the Suspend command in the second embodiment differs from its counterpart in the first embodiment in the number of bits assigned to App_id and in that App_type is omitted.

FIG. 23 illustrates the items included in the trigger information serving as the Terminate command. The Terminate command is designed to cause the receiver 60 to terminate an active data broadcasting application.

The items included in the trigger information serving as the Terminate command in the second embodiment are the same as those in the first embodiment shown in FIG. 12. It should be noted, however, that the Terminate command in the second embodiment differs from its counterpart in the first embodiment in the number of bits assigned to App_id and in that App_type is omitted.

FIG. 24 illustrates an example of syntax of the trigger information as one of the above commands in the second embodiment. It should be noted that any syntax can be used for trigger information and that the syntax thereof is not limited to the example shown in FIG. 24.

[Description of the Registration and Management of Application]

Trigger information is handled by the receiver 60 in the second embodiment roughly in the same manner as in the first embodiment described above. The difference between the two is that a data broadcasting application is acquired and stored in response to reception of trigger information serving as the Pre-cache command (step S5 in FIG. 15) in the handling of trigger information in the first embodiment. In the second embodiment, however, a data broadcasting application is registered and managed in response to reception of trigger information serving as the Register command. That is, the registration and management of an application is performed in place of step S5 in FIG. 15.

Figure 25:
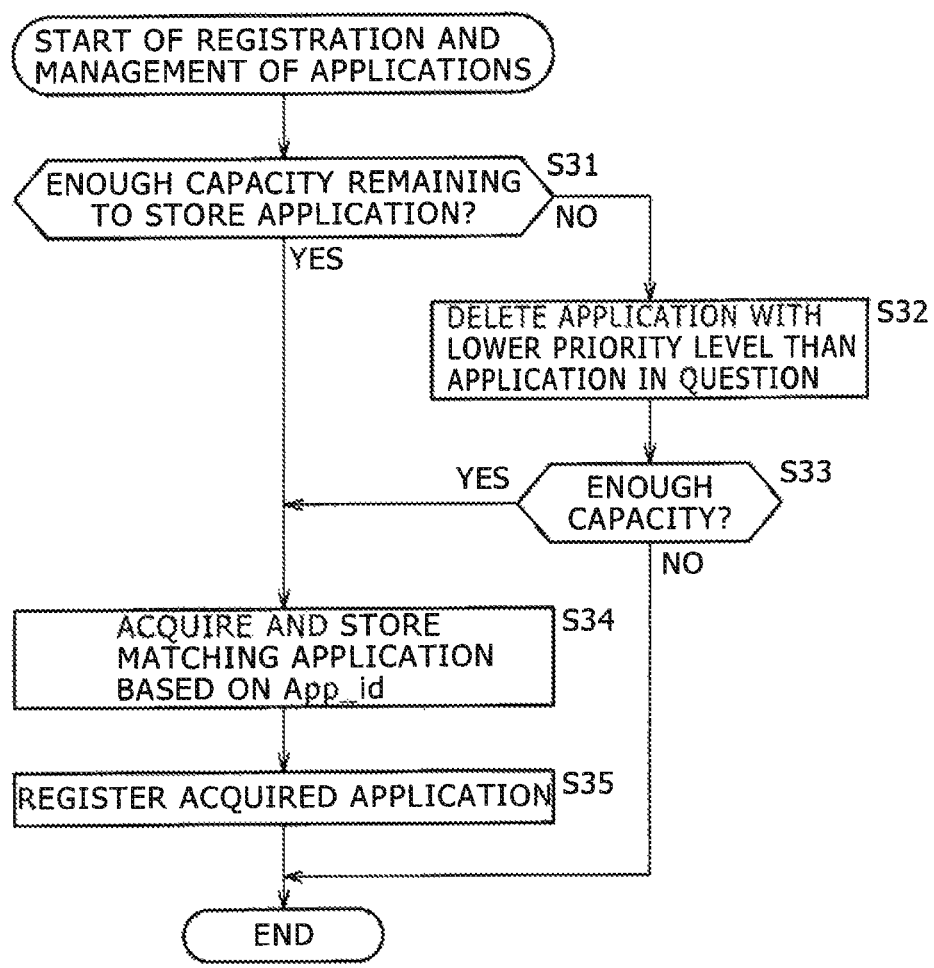
FIG. 25 is a flowchart describing the registration and management of an application.

FIG. 25 is a flowchart describing the registration and management of an application. The registration and management of an application begins if it is determined that the received trigger information is the Register command.

In step S31, the control section 68 determines whether the recording section 71 has enough capacity to store the data broadcasting application specified by trigger information. The process proceeds to step S34 when it is determined that the recording section 71 has enough capacity. In contrast, the process proceeds to step S32 if it is determined that the recording section 71 does not have enough capacity.

In step S32, the control section 68 causes, of all the data broadcasting applications stored in the recording section 71 (that is, already registered), the application with a lower priority level than that specified by the trigger information to be deleted from the recording section 71. In step S33, the control section 68 determines whether the recording section 71 has enough capacity to store the data broadcasting application specified by the trigger information. When it is determined that the recording section 71 has enough capacity, the process proceeds to step S34. On the other hand, if it is determined that the recording section 71 does not have enough capacity, the associated data broadcasting application is not acquired, thus terminating the registration and management of an application.

In step S34, the control section 68 causes the data broadcasting application indicated by App_id in the trigger information to be acquired from the acquirer and stored in the recording section 71. In step S35, the control section 68 registers the acquired and stored data broadcasting application (manages the data broadcasting application so as to be associated with its priority level and expire date). This completes the registration and management of an application.

It should be noted that a registered data broadcasting application is deleted from the recording section 71 when its expire date is exceeded. This erases the registration of the data broadcasting application in question.

[Second Example of State Transitions of the Data Broadcasting Application]

FIG. 26 is a state transition diagram of a data broadcasting application adapted to run in the receiver 60 in response to trigger information serving as each of Register, Execute, Inject_event, Suspend and Terminate, i.e., the five different commands in the second embodiment. As illustrated in FIG. 26, the data broadcasting application is defined to be in one of four different states, namely, Released, Ready, Active and Suspended.

The Released state refers to a state in which the data broadcasting application has yet to be acquired by the receiver 60. The Ready state refers to a state in which the data broadcasting application has already been registered by the receiver 60 but has yet to be activated. The Active state refers to a state in which the data broadcasting application is active. The Suspended state refers to a state in which the data broadcasting application has been suspended and the information indicating the state in which the application was at the time of suspension is stored in the save memory 75B.

FIG. 27 illustrates the relationship between the commands and state transitions.

When in the Released state (when the application has yet to be acquired by the receiver 60), the data broadcasting application makes a transition to the Ready state if acquired, stored and registered in accordance with the trigger information of the Register command.

When in the Ready state, the data broadcasting application makes a transition to the Active state if activated in accordance with the trigger information of the Execute command.

On the other hand, when in the Released state (when the application has yet to be acquired by the receiver 60), the data broadcasting application makes a transition to the Active state if acquired, registered and activated in accordance with the trigger information of the Execute command.

When in the Active state, the data broadcasting application makes a transition to the Suspended state if suspended in accordance with the trigger information of the Suspend command.

On the other hand, when in the Active state, the active data broadcasting application makes a transition to the Ready state if terminated in accordance with the trigger information of the Terminate command. It should be noted that the application makes a transition to the Ready state also if the limit for changing the channels indicated by App_life-_scope is exceeded or if other data broadcasting application is activated.

When in the Suspended state, the suspended data broadcasting application makes a transition to the Active state if resumed in accordance with the trigger information of the Execute command.

On the other hand, when in the Suspended state, the suspended data broadcasting application makes a transition to the Ready state in accordance with the trigger information of the Terminate command.

When in the Ready, Active or Suspended state, and if the expire date thereof is exceeded, the data broadcasting application is deleted from the recording section 71 and its registration is erased, making a transition to the Released state.

[Life Cycle of a Data Broadcasting Application]

In the first embodiment, if an active data broadcasting application is terminated, the application is deleted from the recording section 71. In contrast, a registered data broadcasting application is not deleted in the second embodiment until its expire date is exceeded even if the registered application is activated and terminated. This makes it possible to activate and terminate a registered data broadcasting application a plurality of times as illustrated in FIG. 28. It should be noted, however, that a data broadcasting application with a low priority level may be deleted from the recording section 71 irrespective of the expire date if its storage capacity is insufficient.

FIGS. 28A to 28C illustrate three possible life cycles of data broadcasting applications in the second embodiment.

FIG. 28A illustrates a life cycle of a data broadcasting application that is activated and terminated only once. This data broadcasting application is registered and activated in response to the Execute command and terminated in response to the Terminate command, thus making a transition to the Ready state. Then, the application is deleted from the recording section 71 when the expire date is exceeded.

FIG. 28B illustrates a life cycle of a data broadcasting application that is registered and then activated and terminated a plurality of times. This data broadcasting application is acquired, stored and registered in response to the Register command, activated in response to the Execute command and terminated in response to the Terminate command, thus making a transition to the Ready state. Then, the application is activated again in response to the Execute command and terminated in response to the Terminate command, thus making a transition to the Ready state. Then, the application is deleted from the recording section 71 when the expire date is exceeded.

FIG. 28C illustrates a life cycle of a data broadcasting application that makes a transition to the Suspended state. This data broadcasting application is acquired, stored and registered in response to the Register command, activated in response to the Execute command and makes a transition to the Suspended state in response to the Suspend command. Then, the application is resumed in response to the Execute command and terminated in response to the Terminate command, thus making a transition to the Ready state. Then, the application is deleted from the recording section 71 when the expire date is exceeded.

[Running a Plurality of Data Broadcasting Applications]

Only a case has been described above in which a data broadcasting application is activated in response to trigger information serving as the Execute command. However, it is possible to activate a data broadcasting application without using trigger information serving as the Execute command. More specifically, it is only necessary to include, in a data broadcasting application App0 to be activated in response to the Execute command, a function adapted to activate other data broadcasting applications App1 and App2. This makes it possible to activate, for example, the data broadcasting application App1 in response to the progress of the data broadcasting application App0 or to an operation made by the user in the data broadcasting application App0.

Figure 30:
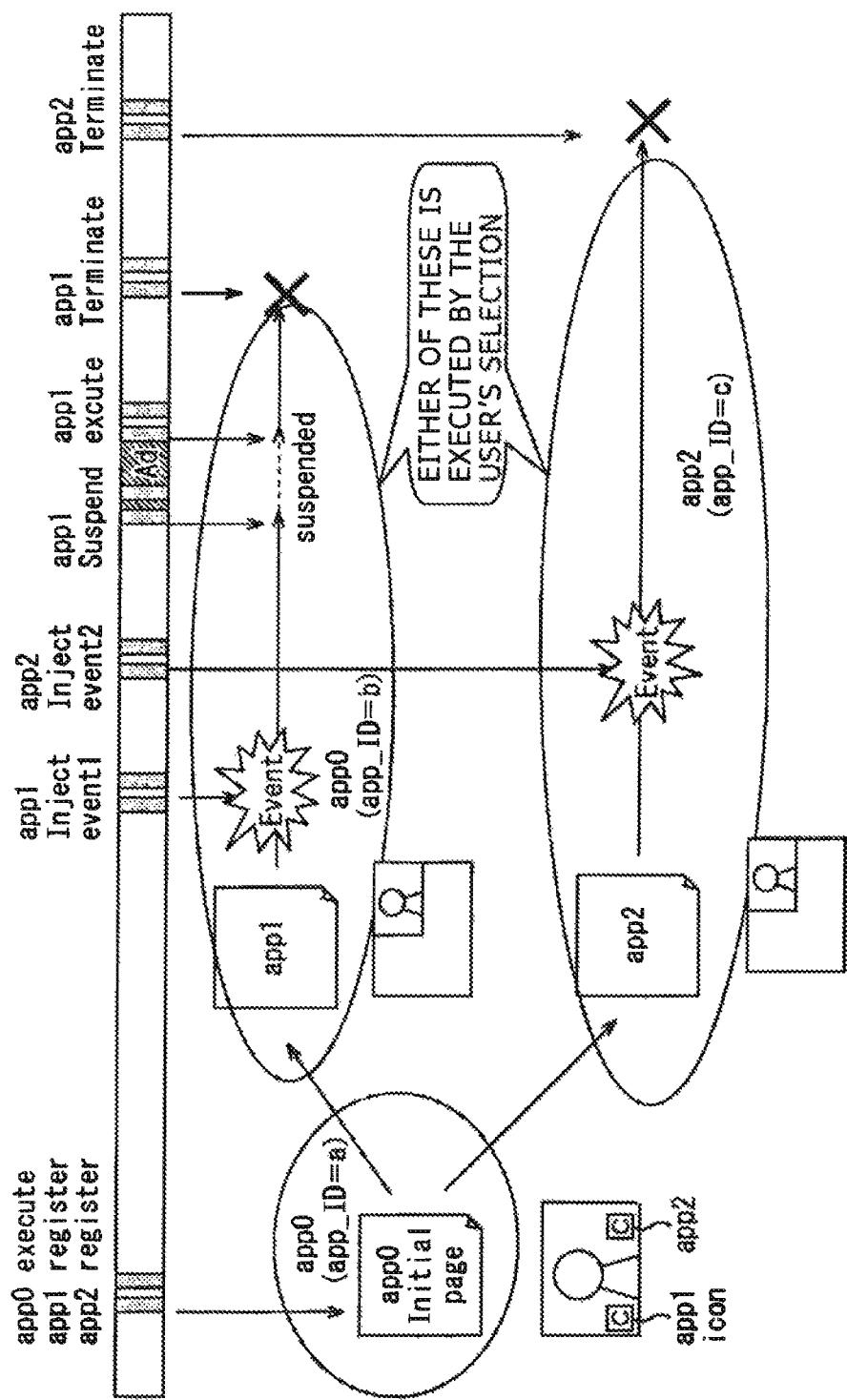
FIG. 30 is a diagram illustrating an operation example of the multiple application programs.

FIG. 30 illustrates an example of running three data broadcasting applications app0, app1 and app2 in conjunction with each other.

First, trigger information serving as the Execute command for the data broadcasting application app0, that serving as the Register command for the data broadcasting application app1 and that serving as the Register command for the data broadcasting application app2 are broadcast. The receiver 60 that receives these pieces of trigger information acquires, registers and activates the data broadcasting application app0. Two icons, one for the data broadcasting application app1 and another for the data broadcasting application app2, appear on the screen of the active data broadcasting application app0. At the same time, the data broadcasting applications app1 and app2 are acquired and registered.

When the user selects the icon for the data broadcasting application app1 on the screen of the data broadcasting application app0, the active data broadcasting application app0 is terminated, and the data broadcasting application app1 is activated. Then, an event is fired in the active data broadcasting application app1, or the same application app1 is suspended, resumed or terminated in response to each of the commands for the same application app1, namely, Inject_event, Suspend, Execute and Terminate.

When the user selects the icon for the data broadcasting application app2 on the screen of the data broadcasting application app0, the active data broadcasting application app0 is terminated, and the data broadcasting application app2 is activated. Then, an event is fired in the active data broadcasting application app2, or the same application app2 is terminated in response to each of the commands for the same application app2, namely, Inject_event and Terminate.

The above approach makes it possible to activate a plurality of data broadcasting applications in conjunction with each other without using trigger information serving as the Execute command.

As described above, in both the first and second embodiments, the processes related to data broadcasting applications can be performed in response to AV content such as a program or CM.

Further, even if a digital television program is retransmitted via a CATV or satellite communication network, it is possible to implement data broadcasting content services that can be executed in response to the television program.

Incidentally, the above series of processes may be performed by hardware or software. If the series of processes are performed by software, the program making up the software is installed from a program recording medium to a computer incorporated in dedicated hardware, a general-purpose personal computer capable of performing various functions when installed with various programs or other computer.

FIG. 31 is a block diagram illustrating a hardware configuration example of a computer adapted to perform the above series of processes using a program.

In a computer 100, a CPU (Central Processing Unit) 101, ROM (Read Only Memory) 102 and RAM (Random Access Memory) 103 are connected to each other via a bus 104.

An I/O interface 105 is also connected to the bus 104. An input section 106 and output section 107 are connected to the I/O interface 105. The input section 106 includes, for example, a keyboard, mouse and microphone. The output section 107 includes, for example, a display and speaker. Further, a storage section 108, communication section 109 and drive 110 are connected to the I/O interface 105. The storage section 108 includes, for example, a harddisk or non-volatile memory. The communication section 109 includes, for example, a network interface. The drive 110 drives a removable media 111 such as magnetic disk, optical disk, magneto-optical disk or semiconductor memory.

In the computer configured as described above, the CPU 101 loads the program from the storage section 108 into the RAM 103 for execution via the I/O interface 105 and bus 104, thus allowing for the above series of processes to be performed.

The program executed by the computer may perform the processes not only chronologically according to the sequence described in the present specification but also in parallel or when necessary as when invoked.

On the other hand, the program may be executed by a single computer or by a plurality of computers in a distributed manner. Further, the program may be transferred to a remote computer for execution.

On the other hand, the term "system" refers to an apparatus as a whole made up of: a plurality of devices.

It should be noted that the embodiments of the present disclosure are not limited to those described above and may be modified in various manners without departing from the scope of the present disclosure.

What is claimed is:

1. A receiver for receiving transmitted AV content of a digital television broadcast signal, the receiver comprising:
    an extraction section that extracts trigger information, transmitted together with the AV content within the digital television broadcast signal, about control over an application program to be executed, the trigger information containing information that identifies the application program to be executed; and
    a control section that controls a transition of the application program from a first state to a second state based on the extracted trigger information, the first state and the second state each being one of the following:
        an active state, which is a state where the application program is active; and
        a suspend state, which is a state where the application program is suspended and a suspended state information indicating a status in which the application program was at the time of suspension is stored,
    wherein the first state and the second state are different states,
    wherein a video signal of the AV content is combined, with an image created by the application program when the application program is executed, for display on a display screen, and
    wherein the extraction section and the control section are each implemented via at least one processor.

2. The receiver of claim 1, wherein
if the extracted trigger information is a Suspend command, the control section controls the application program to enter the suspend state, and suspends the active application program and stores in a memory the suspended state information indicating the state of the application program at the time of suspension.

3. The receiver of claim 2, wherein
if the extracted trigger information is an Execute command and when the suspended state information is stored in the memory that indicates the state of the application program to be activated at the time of suspension, the control section controls the application program to enter the active state, and resumes the application program from the suspend state based on the suspended state information.

4. The receiver of claim 1, wherein
the first state and the second state are each one of the following:
    a ready state, which is a state where the application program is prepared for execution, but has not been activated;
    the active state; and
    the suspend state; and
if the extracted trigger information is a Pre-cache command, the control section causes the application program to be acquired from a broadcasting signal of the AV content or from a predetermined server based on the trigger information, and controls the application program to enter the ready state.

5. The receiver of claim 1, wherein
if the extracted trigger information is an Execute command and when the application program to be activated has yet to be acquired, the control section causes the application program to be acquired from a broadcasting signal of the AV content or from a predetermined server based on the trigger information.

6. The receiver of claim 1, wherein
the first state and the second state are each one of the following:
    a ready state, which is a state where the application program is prepared for execution, but has not been activated;
    the active state; and
    the suspend state; and
if the extracted trigger information is a Register command, the control section causes the application program to be acquired from a broadcasting signal of the AV content or from a predetermined server based on the trigger information, causes the application program to be stored, manages the acquired application program so as to be associated with an expire date provided by the trigger information, and controls the application program to enter the ready state.

7. The receiver of claim 1, wherein
the first state and the second state are each one of the following:
    a ready state, which is a state where the application program is prepared for execution, but has not been activated;
    the active state; and
    the suspend state; and
if the extracted trigger information is a Register command, the control section causes the application program to be acquired from a broadcasting signal of the AV content or from a predetermined server based on an identification information of the application program also serving as location information of the application program, causes the application program to be stored, and controls the application program to enter the ready state.

8. The receiver of claim 6, wherein
if the expire date associated with the application program is exceeded, the control section causes the application program to be deleted.

9. The receiver of claim 6, wherein
if the extracted trigger information is the Register command, the control section further manages the acquired application program so as to be also associated with a priority level included in the trigger information.

10. The receiver of claim 9, wherein
if a storage capacity is insufficient to store the application program when acquired, the control section provides sufficient storage capacity by deleting, of application programs that have previously been registered, an application program with a lower priority level than the priority level associated with the application program being acquired.

11. A reception method for receiving transmitted AV content of a digital television broadcast signal, the reception method comprising:
extracting trigger information, transmitted together with the AV content within the digital television broadcast signal, about control over an application program to be executed, the trigger information containing information that identifies the application program to be executed;
controlling a transition of the application program from a first state to a second state based on the extracted trigger information, the first state and the second state each being one of the following:
an active state, which is a state where the application program is active; and
a suspend state, which is a state where the application program is suspended and a suspended state information indicating a state in which the application program was at the time of suspension is stored; and
combining, for display on a display screen, a video signal of the AV content with an image created by the application program when the application program is executed,
wherein the first state and the second state are different states.

12. A non-transitory computer-readable medium having embodied thereon a program, which when executed by a processor within a receiver adapted to receive transmitted AV content of a digital television broadcast signal, the program causes the processor to control the receiver to perform a reception method, the method comprising:
extracting trigger information, transmitted together with the AV content within the digital television broadcast signal, about control over an application program to be executed, the trigger information containing information that identifies the application program to be executed;
controlling a transition of the application program from a first state to a second state based on the extracted trigger information, the first state and the second state each being one of the following:
an active state, which is a state where the application program is active; and
a suspend state, which is a state where the application program is suspended and a suspended state information indicating a state in which the application program was at the time of suspension is stored; and
combining, for display on a display screen, a video signal of the AV content with an image created by the application program when the application program is executed,
wherein the first state and the second state are different states.

13. A transmitter for transmitting AV content of a digital television broadcast signal, the transmitter comprising:
a transmission section that transmits, together with the AV content within the digital television broadcast signal, trigger information about control over an application program to be executed by a receiver,
wherein the trigger information contains information that identifies the application program to be executed, and indicates a state to which the application program should be transitioned by the receiver, the state being:
a suspend state, which is a state where the application program is suspended and a suspended state information indicating a state in which the application program was at the time of suspension is stored,
wherein a video signal of the AV content is combined, with an image created by the application program when the application program is executed, for display on a display screen, and
wherein the transmission section is implemented via at least one processor.

14. The transmitter of claim 13, wherein
the transmission section transmits the trigger information as contained in an adaptation field of a packet making up a transport stream for the AV content.

15. The transmitter of claim 14, wherein
the transmission section transmits the trigger information together with a program clock reference as contained in the adaptation field of the packet making up the transport stream for the AV content.

16. The transmitter of claim 13, wherein
the transmission section transmits the trigger information as embedded in one or more images of the AV content.

17. The transmitter of claim 13, wherein the application program is transitioned by the receiver into the one of the active state and the suspend state indicated by the trigger information, the state indicated by the trigger information being different than the state of the application program prior to the transitioning by the receiver.

18. A transmission method of a transmitter for transmitting AV content of a digital television broadcast signal, the transmission method comprising:
transmitting, together with the AV content within the digital television broadcast signal, trigger information about control over an application program to be executed by a receiver,
wherein the trigger information contains information that identifies the application program to be executed, and indicates a state to which the application program should be transitioned by the receiver, the state being:
a suspend state, which is a state where the application program is suspended and a suspended state information indicating a state in which the application program was at the time of suspension is stored, and
wherein a video signal of the AV content is combined, with an image created by the application program when the application program is executed, for display on a display screen.

19. A non-transitory computer-readable medium having embodied thereon a program, which when executed by a processor within a transmitter adapted to transmit AV content of a digital television broadcast signal, the program causes the processor to control the transmitter to perform a transmission method, the method comprising:
  transmitting, together with the AV content within the digital television broadcast signal, trigger information about control over an application program to be executed by a receiver,
  wherein the trigger information contains information that identifies the application program to be executed, and indicates a state to which the application program should be transitioned by the receiver, the state being:
    a suspend state, which is a state where the application program is suspended and a suspended state information indicating a state in which the application program was at the time of suspension is stored, and
  wherein a video signal of the AV content is combined, with an image created by the application program when the application program is executed, for display on a display screen.

20. A broadcasting system comprising:
  a transmitter that transmits AV content of a digital television broadcast signal; and
  a receiver that receives the transmitted AV content,
  wherein the transmitter includes a transmission section that transmits, together with the AV content within the digital television broadcast signal, trigger information about control over an application program to be executed by the receiver, the trigger information containing information that identifies the application program to be executed by the receiver,
  wherein the receiver includes
    an extraction section that extracts the trigger information, and
    a control section that controls a transition of the application program from a first state to a second state based on the extracted trigger information, the first state and the second state each being one of the following:
      an active state, which is a state where the application program is active; and
      a suspend state, which is a state where the application program is suspended and a suspended state information indicating a status in which the application program was at the time of suspension is stored,
  wherein the first state and the second state are different states,
  wherein a video signal of AV content is combined, with an image created by the application program when the application program is executed, for display on a display screen, and
  wherein the transmission section, the extraction section, and the control section are each implemented via at least one processor.

21. The non-transitory computer-readable medium of claim 12, wherein
  if the extracted trigger information is a Suspend command, the application program is controlled to enter the suspend state, and the active application program is suspended and the suspended state information indicating the state of the application program at the time of suspension is stored in a memory.

22. The non-transitory computer-readable medium of claim 21, wherein
  if the extracted trigger information is an Execute command and when the suspended state information is stored in the memory that indicates the state of the application program to be activated at the time of suspension, the application program is controlled to enter the active state, and the application program is resumed from the suspend state based on the suspended state information.

23. The non-transitory computer-readable medium of claim 12, wherein
  the first state and the second state are each one of the following:
    a ready state, which is a state where the application program is prepared for execution, but has not been activated;
    the active state; and
    the suspend state; and
  if the extracted trigger information is a Pre-cache command, the application program is caused to be acquired from a broadcasting signal of the AV content or from a predetermined server based on the trigger information, and the application program is controlled to enter the ready state.

24. The non-transitory computer-readable medium of claim 12, wherein
  if the extracted trigger information is an Execute command and when the application program to be activated has yet to be acquired, the application program is caused to be acquired from a broadcasting signal of the AV content or from a predetermined server based on the trigger information.

25. The non-transitory computer-readable medium of claim 12, wherein
  the first state and the second state are each one of the following:
    a ready state, which is a state where the application program is prepared for execution, but has not been activated;
    the active state; and
    the suspend state; and
  if the extracted trigger information is a Register command, the application program is caused to be acquired from a broadcasting signal of the AV content or from a predetermined server based on the trigger information, the application program is caused to be stored, the acquired application program is managed so as to be associated with an expire date provided by the trigger information, and the application program is controlled to enter the ready state.

26. The receiver of claim 25, wherein
  if the expire date associated with the application program is exceeded, the application program is caused to be deleted.

27. The non-transitory computer-readable medium of claim 25, wherein
  if the extracted trigger information is the Register command, the acquired application program is further managed so as to be also associated with a priority level included in the trigger information.

28. The non-transitory computer-readable medium of claim 27, wherein
  if a storage capacity is insufficient to store the application program when acquired, sufficient storage capacity is provided by deleting, of application programs that have previously been registered, an application program with a lower priority level than the priority level associated with the application program being acquired.

29. The non-transitory computer-readable medium of claim 12, wherein the first state and the second state are each one of the following:
  a ready state, which is a state where the application program is prepared for execution, but has not been activated;
  the active state; and
  the suspend state; and
if the extracted trigger information is a Register command, the application program is caused to be acquired from a broadcasting signal of the AV content or from a predetermined server based on an identification information of the application program also serving as location information of the application program, the application program is caused to be stored, and the application program is controlled to enter the ready state.

* * * * *